United States Patent [19]
Baran

[11] Patent Number: 5,926,479
[45] Date of Patent: Jul. 20, 1999

[54] MULTIPLE PROTOCOL PERSONAL COMMUNICATIONS NETWORK SYSTEM

[75] Inventor: Paul Baran, Atherton, Calif.

[73] Assignee: Com 21, Inc., Milpitas, Calif.

[21] Appl. No.: 08/843,111

[22] Filed: Apr. 24, 1997

Related U.S. Application Data

[60] Continuation of application No. 08/323,343, Oct. 14, 1994, abandoned, which is a division of application No. 08/078, 561, Jun. 16, 1993, abandoned.

[51] Int. Cl.$^6$ .................................................. H04L 12/56
[52] U.S. Cl. ........................... 370/395; 370/465; 370/252
[58] Field of Search ..................................... 370/395, 252, 370/465, 466, 467, 468, 312, 328, 329, 330, 389; 375/222, 261

[56] References Cited

U.S. PATENT DOCUMENTS

| | | | |
|---|---|---|---|
| 5,359,603 | 10/1994 | McTiffin | 370/95.1 |
| 5,363,408 | 11/1994 | Paik et al. | 375/261 |
| 5,487,065 | 1/1996 | Acampora et al. | 370/95.1 |
| 5,553,069 | 9/1996 | Ueno et al. | 370/60.1 |

*Primary Examiner*—Chau Nguyen
*Attorney, Agent, or Firm*—Allston L. Jones

[57] ABSTRACT

A bi-directional communications system for bypassing a local exchange carrier telephone system for conveying data between at least one terminal unit and a switching unit that has the functionality of a Class 5 central telephone office switch that is connected to a public switched telephone network. The system includes a relay transceiver where the signals from the terminal units are converted bi-directionally between the signal format of the terminal units and fixed length compliant ATM cells when the signal format of the terminal units is other than a fixed length compliant ATM cell format. In a transmission interface unit there is a bi-directional conversion of the fixed length compliant ATM cells to time division multiplexed signals in the upstream direction and from time division multiplexed signals to fixed length compliant ATM cells in the downstream direction, wherein the upstream signal direction is toward the transmission interface unit and the downstream signal direction is toward the terminal units. Further, the system includes the transfer of the time division multiplexed signals to the switching unit. In another embodiment of the present invention there can be at least two terminal units each designed to transmit and receive in different signal formats from each other and a programmable relay transceiver unit.

1 Claim, 18 Drawing Sheets

PRIOR REFERENCED INVENTION

| | STATE # | FUNCTION |
|---|---|---|
| CABLE MODEM | 1<br>2. | Receive serial data from cable.<br>Transmit serial data to cable. |
| | 3.<br>4. | Housekeeping data to microcontroller<br>Housekeeping data from microcontroller. |
| TELEPHONE INTERFACE UNIT | 5.<br>6. | Receive serial data from telephone line.<br>Transmit serial data to telephone line. |
| | 7.<br>8. | Housekeeping data to microcontroller.<br>Housekeeping data from microcontroller. |
| SOFTWARE DEFINED TRANSCEIVER | 9.<br>10.<br>11.<br>12.<br>13.<br>14. | Receive cells in Format #1.<br>Transmit cells in Format #1.<br>Receive serial data in Format #2.<br>Transmit serial data in Format #2.<br>Receive serial data in Format #3.<br>Transmit serial data in Format #3 |
| | 15.<br>16. | Housekeeping data to microcontroller.<br>Housekeeping data from microcontroller |

FIG. 3b.

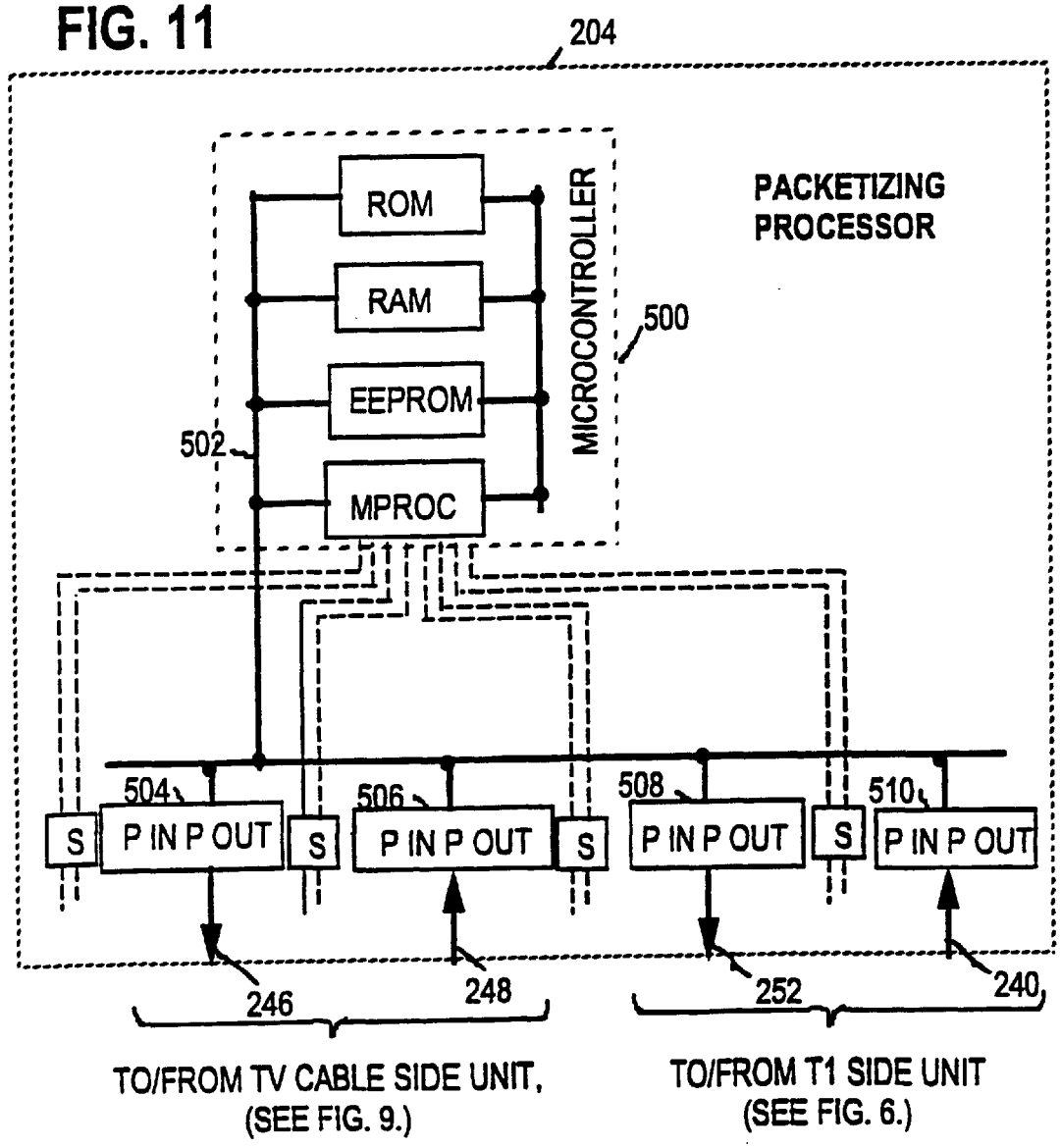

MULTIPLE PROTOCOL PERSONAL COMMUNICATIONS NETWORK SYSTEM

CROSS-REFERENCES

This is a continuation of application Ser. No. 08/323,343 filed on Oct. 14, 1994, abandoned, which is a divisional of prior application Ser. No. 08/078,561, filed on Jun. 16, 1993, abandoned.

The present application is related to the following pending patent application by the same inventor:

"DIGITAL TELEPHONE, CABLE TV SYSTEM AND LOCAL EXCHANGE BYPASS NETWORK", Ser. No. 07/761,281 filed Sep. 17, 1991, now U.S. Pat. No. 5,421,030.

"METHOD AND APPARATUS FOR SHARING OF COMMON IN-HOUSE WIRING TO PERMIT MULTIPLE TELEPHONE CARRIERS TO SERVE THE SAME CUSTOMER", U.S. Pat. No. 5,341,415 issued Aug. 23, 1994.

"CELL BASED WIDE AREA NETWORK ALTERNATIVE ACCESS TELEPHONE AND DATA SYSTEM", Ser. No. 07/953,744 filed Sep. 29, 1992.

"WIDE AREA FIBER AND TV CABLE FAST PACKET CELL NETWORK", Ser. No. 08/000,373 filed Jan. 4, 1993, now U.S. Pat. No. 5,425,027.

BACKGROUND OF THE INVENTION

1. Field of the Invention

This invention relates to personal communication networks in general and, in specific, those that use a TV cable system as a transmission medium and where signals are sent using ATM compliant cell formats.

2. Description of Related Art

A significant portion of a long distance telephone bill is attributable to transfer payments required to be made by the long distance carrier to the local telephone companies at each end of the circuit. To reduce such fees for local interconnection, long distance inter-exchange carriers seek an alternative path to deliver signals from a subscriber's telephone directly to the long distance carrier switch thus bypassing local telephone companies facilities.

In the co-pending patent applications identified above in the Cross Reference section, ATM based communications systems are described wherein cordless terminal devices generate and utilize ATM compliant fast pocket cells transmitted over TV cable and/or fiber optic pathways. In the cross-referenced patent applications cell based formats are used throughout. Starting at the user's terminal device, the cells are transmitted using cordless means, and thence over cable and fiber optic paths to reach area wide ATM networks for interconnection to the world's telephone systems.

It would be desirable to have a system that is consistent with the system described in the earlier cross-referenced patent applications, but creates an evolutionary path towards the eventual development of that system without requiring the full system configuration to be in place at the outset. The objective is to create an interia minimal system that can grow into the larger system containing the Directory Computer and interconnected ATM network described in the earlier referenced patent applications.

SUMMARY OF THE INVENTION

In accordance with the present invention there is shown a bi-directional transmission system for conveying data between at least one terminal unit which receive and transmit data in the same signal format as each other and a transmission interface unit. The signals to and from the terminal units are carried by a first communications link to a relay transceiver where the signals from the terminal units are converted bi-directionally between the signal format of the terminal units and fixed length compliant ATM cells when the signal format of the terminal units is other than a fixed length compliant ATM cell format. Via a second communications link the bi-directional transfer of fixed length compliant ATM cells is performed with a transmission interface unit. In the transmission interface unit there is a bi-directional conversion of the fixed length compliant ATM cells to time division multiplexed signals in the upstream direction and from time division multiplexed signals to fixed length compliant ATM cells in the downstream direction, wherein the upstream signal direction is toward the transmission interface unit and the downstream signal direction is toward the terminal units.

There is also shown a bi-directional communications system for bypassing a local exchange carrier telephone system which is an extension of the bi-directional transmission system described above with the time division multiplex signal being exchanged bi-directionally via a third communications link between the transmission interface unit and a switching unit that has the functionality of a Class 5 central telephone office switch that is connected to a public switched telephone network.

Further, either the bi-direction transmission system or the bi-directional communication system described above can include a second communications link that includes a multiplicity of n bi-directional tandemly connected second communications links and a third communications link includes a multiplicity of a bi-directional tandemly connected third communications links. In such a system the transmission interface unit, for maximum utility should also have sufficient capacity to convert signals from any of the n second communications links to any of the m third communications links, wherein n and m are each positive integers.

In yet another embodiment of the present invention in either of the systems discussed above there can be at least two terminal units each designed to transmit and receive is different signal formats from each other and a programmable relay transceiver unit. In this embodiment the relay transceiver unit includes a software definable receiver a software definable transmitter, a receiver processing unit and a transmitter processing unit. The function of the software definable transmitter unit is to transmit radio signals via the first communications link to one of the terminal units in the signal format of that terminal unit. The function of the software definable receiver unit is to receive radio signals also via the first communications link from one of the terminal units. To control the operation of software definable receiver unit the receiver processing unit is provided and that unit performs several functions, including determining from the signal received by the software definable receiver unit the format and validity of the received signal from the terminal unit by comparing the characteristics of the received signal against stored characteristics of the possible signal formats until a match is found and for a call originating upstream to also compare the address of the responding terminal unit to the address of the upstream originated call, changing the parameters of the software definable receiver unit to the characteristics of the identified signal format including the frequency, bandwidth, modulation, bit timing and sensitivity thereof, and converting the received signals from the terminal unit to fixed length compliant ATM cells. Similarly, to control the transmitter processing unit the transmitter processing unit is provided and that unit performs several functions, including changing the parameters of the software definable transmitter unit responsive to the receiver processing unit including the center frequency, bandwidth, modulation, bit timing and power output thereof, sequentially transmitting test signals in the possible signal formats of the terminal units to the terminal units when the call originates upstream until the signal format of the addressed terminal unit is determined by the receiver processor unit and the receiver processor unit provides the characteristic settings to the transmitter processing unit, and converting the fixed length complaint ATM cells to the format of the terminal unit to which signals are to be sent.

The present invention also individually includes the two forms of the bi-directional relay transmission interface unit as discussed above with respect to the two systems of the present invention.

Further scope and applicability of the present invention will become apparent from the description given hereinafter. However, it should be understood that the details of the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE FIGURES

FIG. 3b is a state table that defines the various operations of the microcontroller of the block diagram of FIG. 3a.

FIG. 5b is a simplified flow chart showing the major processing flows through the blocks in FIG. 5a.

FIG. 11 is a detailed block diagram of the packetizing processor of FIGS. 5a and 5b.

DETAILED DESCRIPTION OF THE PREFERRED EMBODIMENT

Figure 1:
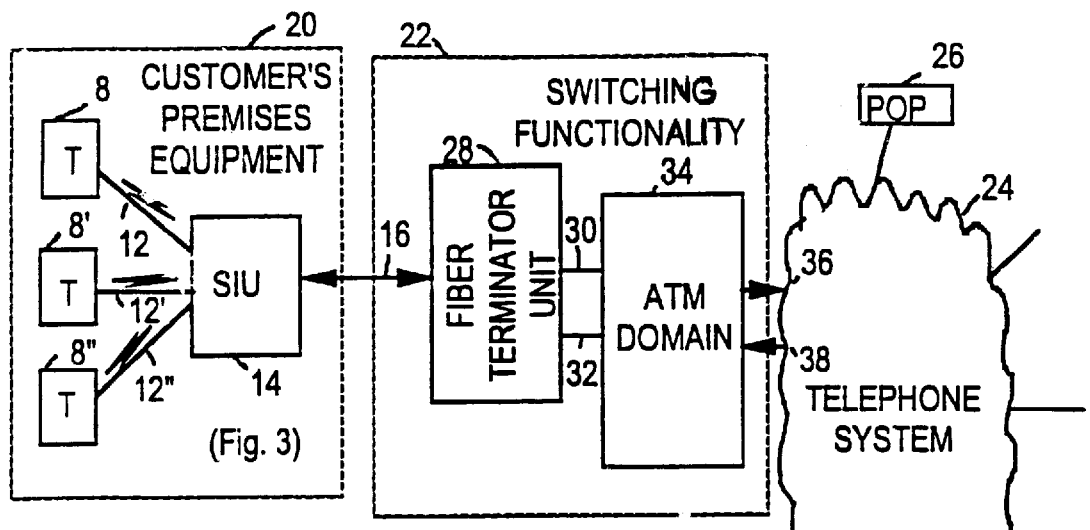
FIG. 1 is a prior art block diagram of the communications system described in the cross-referenced co-pending patent applications of the same inventor.

FIG. 1 is a simplified version of FIG. 1b of the above-referenced patent application by the same inventor entitled "Cell Based Wide Area Network Alternative Access Telephone and Data System" (Ser. No. 07/953744, filed Sep. 29, 1992). In that application a Wide Area Network (WAN) Asynchronous Transfer Mode (ATM) compliant cell based communications system delivers high data rate cells form a plurality of terminal devices to support a multiplicity of simultaneous terminal device applications for homes and businesses was disclosed. That system supports multichannel voice and data communications on cable TV systems and to tie multiple cable TV systems and telcos together for transmission of voice and data communication between any combination of them.

In the co-pending patent application identified above, ATM based communications systems are described wherein cordless terminal devices generate and utilize ATM compliant fast packet cells that are transmitted over TV cable and/or fiber optic pathways. In each of the above cross-referenced patent applications cell based formats are used throughout. Starting at the user's terminal device, the cells are transmitted using cordless means, and thence over cable and fiber optic paths to reach area wide ATM networks for interconnection to the world's telephone systems.

More specifically, as illustrated in FIG. 1 herein, the customer's premises equipment 20 may include several cordless ATM based terminal units 8, 8' and 8", such as cordless telephones, data transfer devices and computer terminals which are in communication via radio signals 12, 12' and 12", respectively, with a small, in-house, multi protocol relay station called the Subscribers Interface Unit (SIU) 14. SIU 14 is in turn connected to a TV cable system by cable 16, for example a coaxial cable and/or an optical transmission path. At the head end of the cable TV system, in the unit subsystems identified here as switching functionality 22, there is included fiber terminator unit 28 to transfer the signals between the fiber optic and wire transmission domains and, via lines 30 and 32, to communicate with the interconnected larger ATM domain 34. Where the ATM domain 34 interconnects with the PCM/T1 world telephone system, the ATM signals are converted to PCM/T1 domain for compatibility with the existing telephone system. Additionally, directory computer 25 is used to provide address translation as described in the cross-referenced patent applications.

One objective of the present invention is to create a cost-effective, technically viable technology to permit competition with local telephone exchanges by providing an alternative transmission path to the unregulated long distance telephone carriers. Accordingly, one embodiment of the present invention takes signals from non-cell based terminals connected to the TV cable and converts them into formatted ATM cells. It then transmits these ATM cells efficiently via a limited TV cable bandwidth to reach a cable TV hub. Here the ATM cells are converted to PCM/T1 signals needed for connection to a cellular telephone switch (MTSO).

Figure 2:
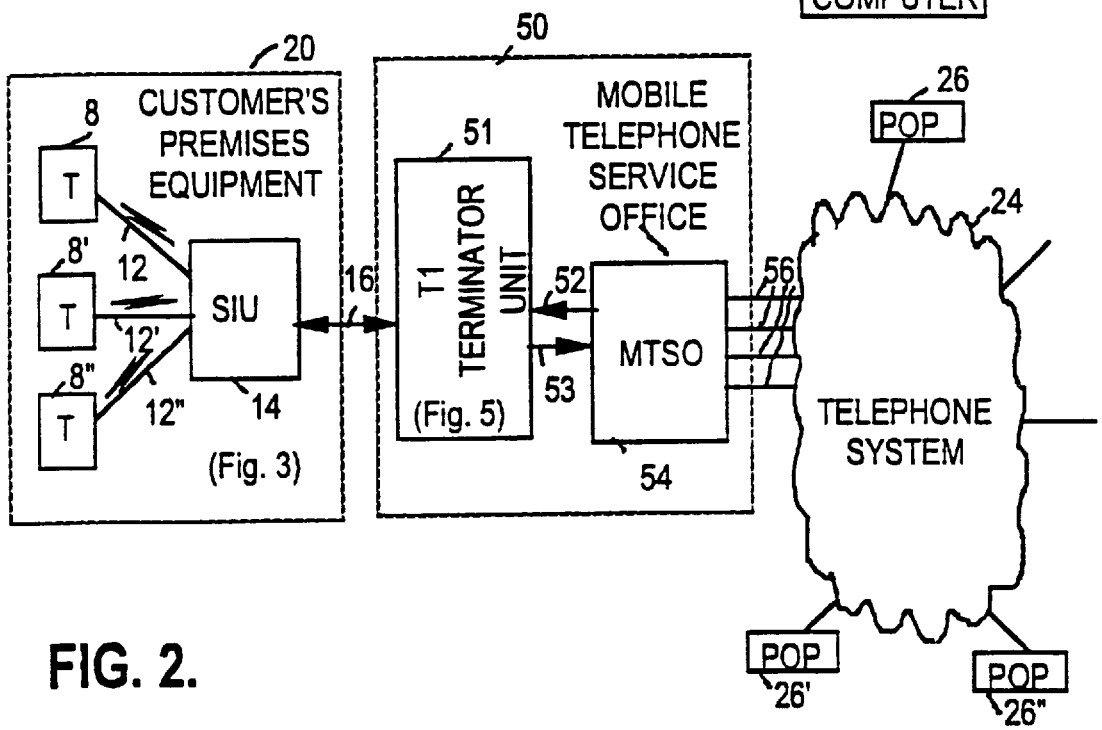
FIG. 2 is a block diagram showing the modified portions of the system of FIG. 1 wherein one embodiment of the present invention resides for the conversion of signals from non-cell based terminals into formatted cells, etc.

FIG. 2 shows an embodiment of the present invention which is an interim configuration between the total ATM system of the above cross referenced patent applications and the present PCM based world telephone system. Here the focus is on a subset of the prior system as illustrated by FIG. 1 with the conversion between ATM cells and PCM signals occurring closer to the subscriber's end of the system than discussed with respect to FIG. 1 and in the cross-referenced patent applications of the same applicant. In this embodiment, the customer premises equipment 20 and the world telephone system 24 are the same as in FIG. 1. At the head end of cable 16, in place of switching functionality 22 of FIG. 1, there is a new subsystem 50 that includes a T1 terminator unit 51 and a Mobile Telephone Service Office (MTSO) 54. T1 terminator unit 51 is connected to the head-end of TV cable 16 and communicates with MTSO 54 via up and down signal lines 53 and 52, respectively. MTSO 54 in turn communicates with the world-wide telephone system 24 by means of cables 56, which in most installations are leased lines.

The function of T1 terminator unit 51 is two fold. First it performs the operations discussed above of fiber terminator unit 28. In addition it takes the upward bound ATM cells from SIU 14 and converts them into PCM/T1 carrier signals that are commonly used be the telephone companies. The PCM/T1 carrier signals are then transferred to MTSO 54 (typically, a cellular telephone switching office which is tied to the telephone system via leased lines 56 and which also receives signals independent from those of the present invention via radio links from individual cellular telephone hand-sets) for delivery to and from the public switched telephone network 24. In the downward direction MTSO 54 hands off the T1/PCM carrier signals from telephone system 24 to T1 terminator unit 51 which also performs the reverse transformation of those signals to ATM cells for delivery to SIU 14.

For simplicity, FIG. 2 illustrates the present invention in a system wherein the subscriber is connected solely to the world-wide telephone network 24 via a cable TV system that feeds and receives signals from MTSO 54.

Figure 3A:
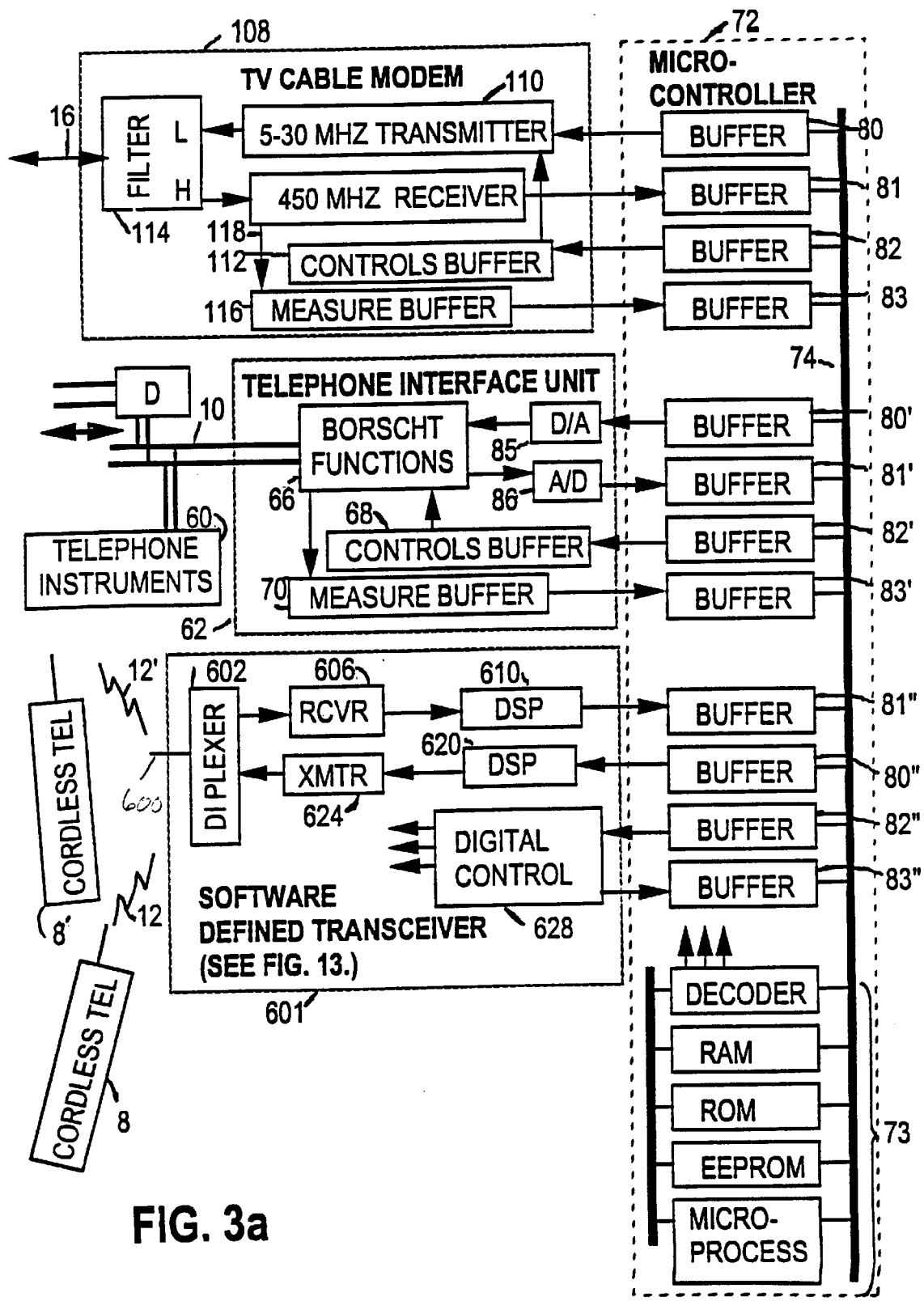
FIG. 3a is a block diagram showing the terminal devices connected to the SIU of the system of the present invention.

In FIG. 3a, SIU 14 of FIGS. 1 and 2 is expanded to show four subsystems thereof to illustrate the connection of the subscriber's cordless telephone units 8 and 8' to both the cable TV system of FIG. 2 and to the subscriber's individual twisted-pair telephone line 10 at the subscriber's site. (This concept is discussed in more detail in the above-referenced patent application by the same inventor entitled "Cell Based Wide Area Network Alternative Access Telephone and Data System", Ser. No. 07/953744, filed Sep. 29, 1992.) As shown here, SIU 14 includes software defined transceiver 601 (which is discussed in additional detail in conjunction with FIG. 13 below) for communicating with cordless telephone 8 and 8', cable TV modem 108, telephone interface unit 62, and microcontroller 72. For purposes of discussion with this figure, cordless telephones 8 and 8' each transmit and receive in the same mode, i.e. all ATM mode or all a serial signal non-cell mode—there is no mixed mode transmission. Other than that limitation the software defined transceiver 601 can support multiple subscriber terminals simultaneously.

The communication between terminals 8 and software defined transceiver is via antenna 600 and diplexer 602, together with programmable receiver 606 and transmitter 624, each of which is controlled by digital signal processor 610 and 620, respectively. Additionally, each of processors 610 and 620 look to digital control 628 for the necessary parameters for receiver 606 and transmitter 624, and, if wireless terminals 8 are other than ATM mode devices, for the necessary control information to convert the upstream serial signals to ATM cells and to perform the reverse conversion from ATM cells to the necessary serial signal for the downstream signals.

TV cable modem 108 is connected to TV cable 16, sending the upstream signals via 5–30 MHz transmitter 110 and receiving the downstream signals via 450 MHz receiver 118 in the way described in the cross referenced earlier filed patent applications. The operation of modem 108 and the other functions performed to transmit and receive telephone calls via TV cable 16 have been described above and in greater detail in this cross referenced pending patent application.

Similarly, telephone interface unit 62 is connected to telephone twisted pair 10 on the subscriber's site. Also shown are a conventional telephone instrument 60 and local exchange demarcation device D which optionally connects the subscriber's on site twisted pair wiring 10 to the local telephone company. This is described in more detail in the above cross-referenced patent application by the same inventor entitled "Method and Apparatus for Sharing Common In-House Wiring to Permit Multiple Telephone Carriers to Serve the Same Customer", U.S. Pat. No. 5,341,415 issued Aug. 23, 1994. Telephone interface unit 62, to perform the usual housekeeping requirements of such a unit, includes block 66 to provide the housekeeping (BORSHT) functions on the incoming and outgoing signals which includes battery, overvoltage protection, ringing, touch-tone decoding, signalling, and hybrid and transmission. These are conventional telephone line support functions under control of signals from controls buffer 68 and measure buffer 70. Telephone interface unit 62 also includes digital to analog converter (D/A) 85 and analog to digital converter (A/D) 86 to interface between BORSCHT unit 66 and microcontroller 72 to send signals to and from the telco lines, respectively.

Since in the present invention the signal format with which each of the software defined transceiver 610, TV cable modem 108, and microcontroller 72 communicate with each other is ATM cells, telephone interface unit 62 must also interface with microcontroller 72 with ATM cells. Thus, in addition, D/A 85 and A/D 86 must also convert the signals between ATM cells and T1/PCM channels in both directions, respectively.

The final component of SIU 14 is microprocessor 72 which includes a microprocessor and the usual supporting RAM, ROM and address decoder collectively numbered 73, a pair of signal buffers 80/81 in communication with each of the other components of SIU 14, and a pair of control and measure buffers 82/83 also each in communication with each of the other components in SIU 14.

Since there are six possible combinations for routing a call that originates at one point in the total connected system of FIG. 3a to any other point in the connected system, microcontroller 72 performs that routing. To perform all of the connections and the housekeeping functions that are also required, microcontroller 72, as shown here, is a 16+ state machine as outlined in the table of FIG. 3b. The microprocessor arrangement 73 determines the destination and path of each byte. Given that information, microprocessor arrangement 73 causes each byte received from the originating unit (108, 62 or 601) in the corresponding receive buffer 81 to be transferred via bus 74 to the transmit buffer 80 associated with unit 108, 62 or 601. Thus, the one of units 108, 62 and 601 which has the byte to be transferred to another of those units writes that byte to its associated receive buffer 81/81'/81". The control and measure information to implement the above transfers is handled using the associated control and measure buffers 82 and 83, respectively, of each of units 108, 62 and 601. Referring to FIG. 3b the allowable states of microcontroller 72 can be seen to define the desired operations.

The output of the TV cable modem 108 is always in the form of ATM cells and conversion of the ATM cells to and from T1/PCM channels occurs in the T1 Terminator Unit 51 (see FIG. 2). The next several figures to be discussed each illustrate that conversion in different symbolic ways.

Figure 4A:
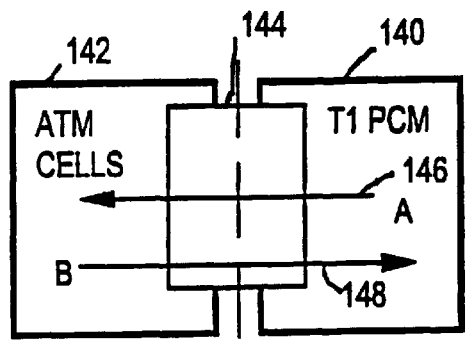
FIG. 4a is a conceptual diagram of the two different data transmission domains present—ATM cells and T1 PCM—which are inter-linked with one another in the present invention.

Referring next to FIG. 4a there is shown a conceptual diagram of the two different data transmission domains that T1 termination unit 51 of FIG. 2, and other units shown and not shown in the various figures, converts back and forth between depending on which direction the signal is being sent, downstream A 146 (T1/PCM to ATM) or upstream B 148 (ATM to T1).

Figure 4B:
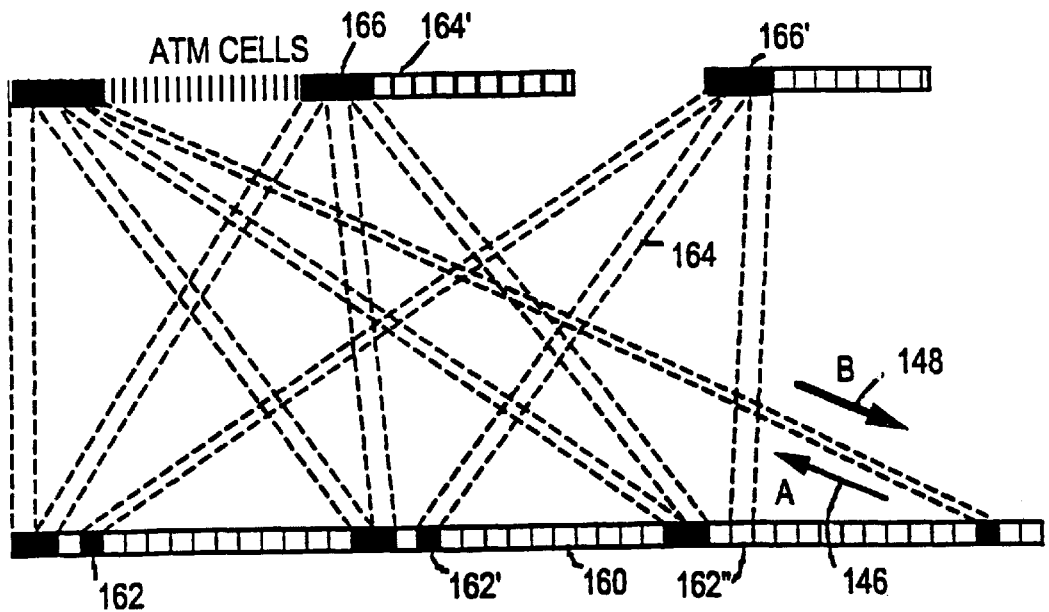
FIG. 4b is a timing diagram illustrating the basic difference in format between ATM cells and PCM transmission.

FIG. 4b presents a timing diagram to illustrate the linear mapping between the ATM and T1/PCM domains. For example, to map multi-byte ATM cell 166' into a T1/PCM time division multiplexed signal the individual consecutive bytes of the ATM cell must be mapped into the time-spaced byte arrangement of the T1/PCM domain, i.e. the three consecutive bytes of ATM cell 166' must be mapped into the equally spaced, time multiplexed and separated T1/PCM bytes 162, 162' and 162", respectively.

For convenience of illustration in FIG. 4b, each ATM cell has been shown to have three bytes when in reality an ATM cell is made up of 53 consecutive 8 bit bytes and each T1 channel is typically made-up of 8-bit serial byte samples.

Figure 5A:
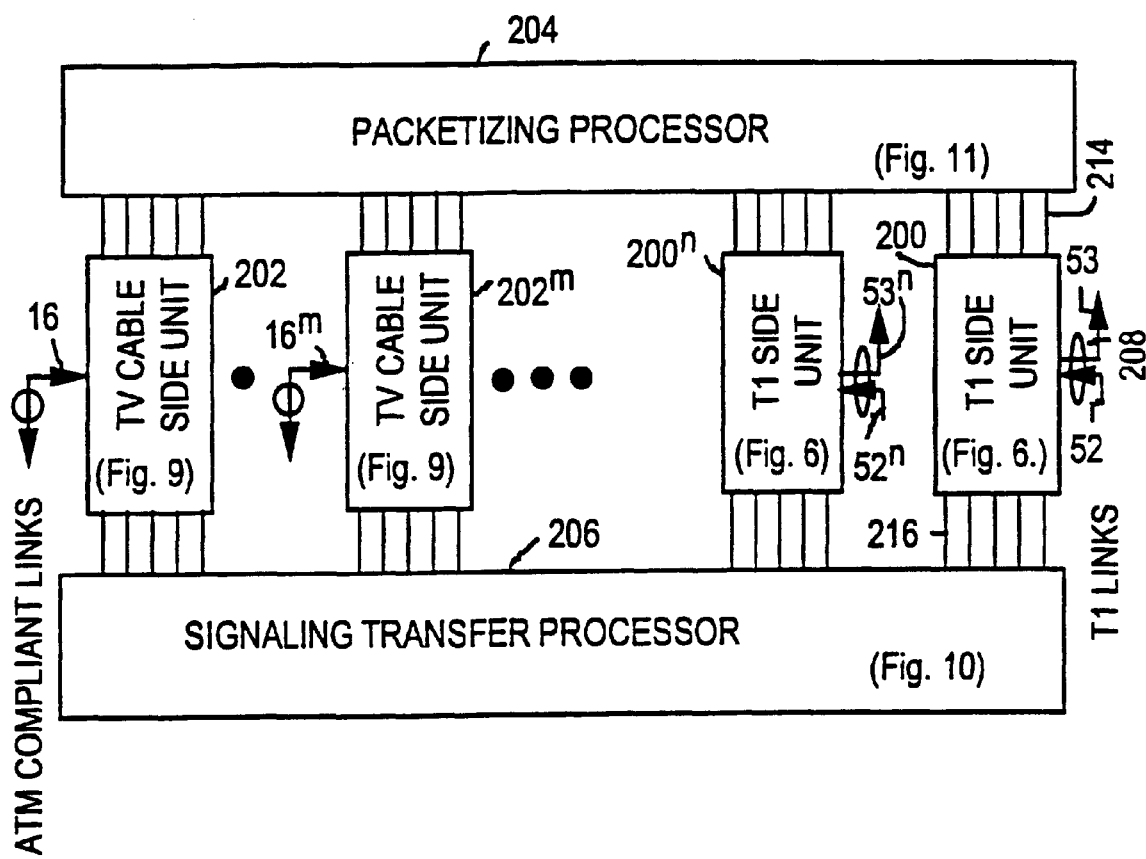
FIG. 5a is an overall block diagram of the T1 terminator unit 51 of FIG. 2.
Figure 5B:
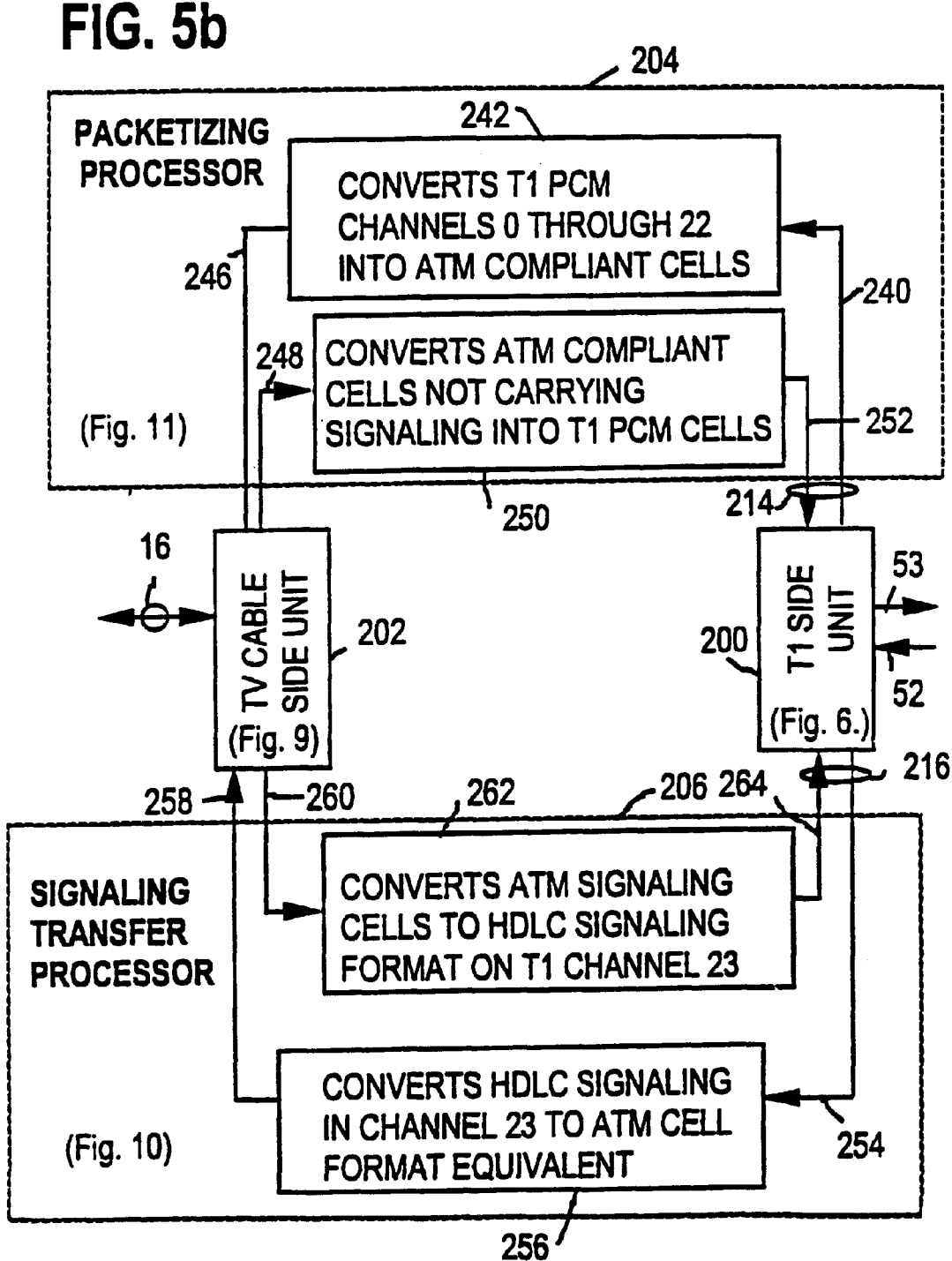
Figure 5C:
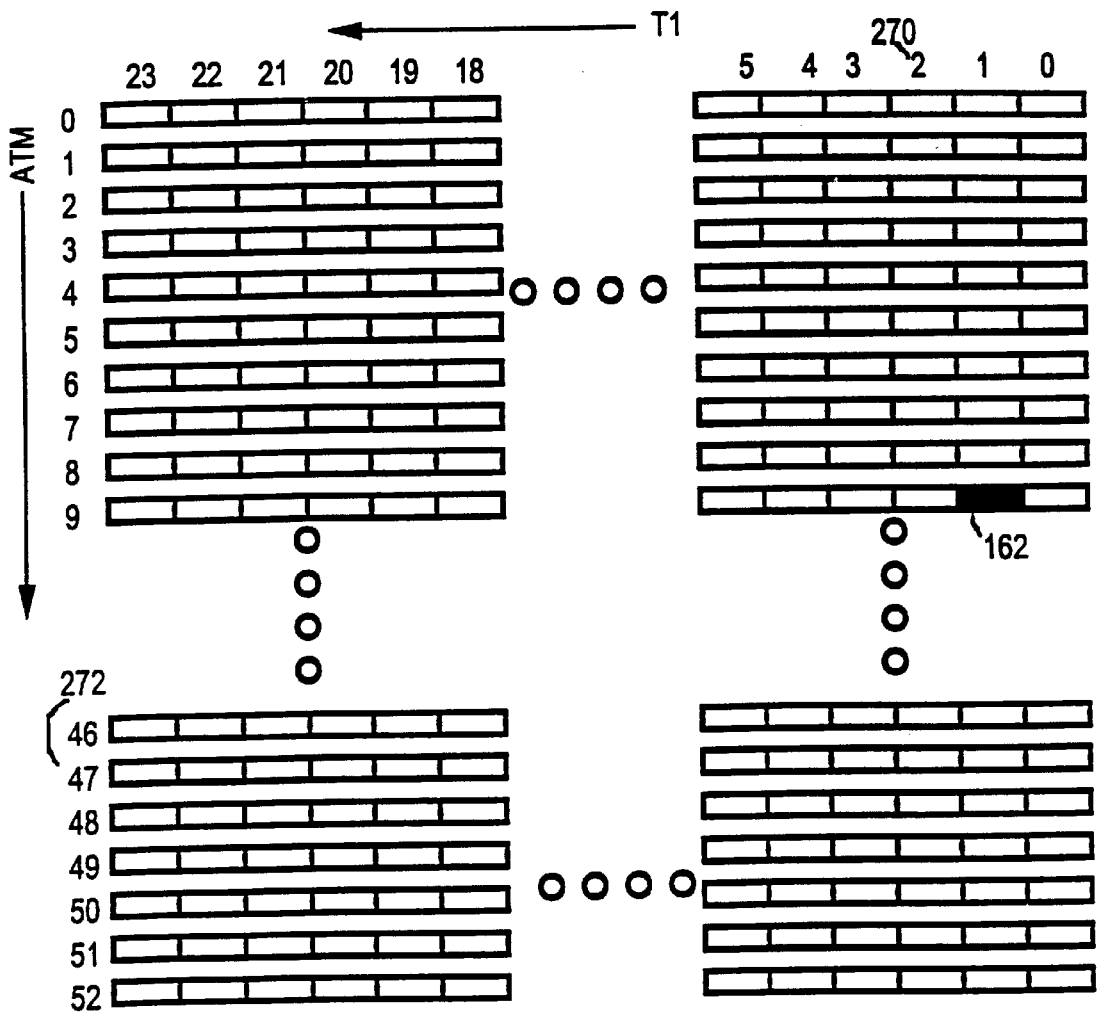
FIG. 5c is a conceptual view of the random access memory storage of the 8-bit bytes of the separate 24 T1 channels of data in PCM format (stored right to left, top to bottom) in row format while the 53 ATM cells are organized as orthogonal columns (top to bottom, left to right) of this matrix.

FIG. 5c is a conceptual view of a random access memory of 53 by 24, 8-bit bytes. If the conversion is from T1 to ATM, then 24 bytes of data from each PCM channel are read-in and stored top to bottom starting in the upper right and progressing in vertical columns to the left with each column being filed from the top in this illustration. After the data is stored, then the corresponding ATM cells are created by reading from the memory starting at the top and reading vertically down a column at a time beginning at the column on the left in this illustration with only the data from occupied PCM channels being converted into ATM cells.

Alternatively, if the conversion is from ATM to T1, then the 53 ATM cells are read into the memory in columns. If no ATM cell was present the column would be left all zeros. Starting in the upper right and progressing to the left a cell at a time across the page to the right. Then the next lower row is read out, and so forth. When the 53 ATM cells are stored then the T1 channels can be read out of memory starting in the right corner and reading a byte at a time to the left for each row and then doing the next lower row, and so forth.

To simplify interconnection with present day cellular telephone switches (MTSO 54 in FIG. 2) without the necessity for the addition of hardware beyond that described herein, ATM compliant cells that contain signalling information are treated separately from those ATM cells that contain voice and data information.

In FIG. 2, the present invention starts with ATM cells from cordless telephone and/or conventional telephone signals, with different characteristics for each of the connected systems at each end of the global circuit. These cells are transmitted via a cable TV system and can be converted into T1/PCM (or other types of signals) at the point of interconnection with a cellular telephone switching office, MTSO 54. The use of ATM cells and not sending cells during silence periods allows serving a larger population of cable users when the limited bandwidth of the TV cable transmission path is the main constraint. In this ATM cell transmission application, it is desirable to limit the telephone signaling information to a single cell.

Two alternative approaches for sending signaling information are commonly used in practice. One approach is that signaling bits can be "robbed" from the bit stream for each voice carrying T1/PCM channel. Alternatively, a single T1/PCM channel (Channel 23) can be reserved solely for the transmission of signaling information. The second approach is used in ISDN (Integrated Service Data Network) implementation and thus is the preferred embodiment described in detail below. However, one skilled in the art could also use the "robbed bit" signaling approach in lieu of the dedicated signaling channel approach to practice the present invention.

The ISDN approach as implemented in the present invention is illustrated in FIG. 5a, 5b and 6 through 12c. FIG. 5a is a block diagram representation of T1 terminator unit 51 of FIG. 2 configured to implement the ISDN approach in which the control signals are carried on a separate channel from the voice and data signals. Here, T1 terminator unit 51 is shown to include several functions which is shown in block diagram form and in each block it is also indicated in which subsequent figure the internal details of that box can be found. Included are 1 through n T1 side units 200 and 200$^n$, respectively, each of which communicate directly with MTSO 54 via the up- and downstream lines 53 and 52, and 53$^n$ and 52$^n$, respectively, as discussed in relation to FIG. 2. At the downstream side of T1 terminator unit 51 are 1 through m TV cable side units 202 and 202$^m$, respectively, each of which communicate directly with a TV cable 16 and 16$^m$, respectively, as discussed in FIG. 2. Linking each of the TV cable side units 202 and 202$^m$ with each of the T1 side units 200 and 200$^n$ for converting the voice and data carrying signals ATM-T1 or T1-ATM is packetizing processor 204. Similarly, linking each of the TV cable side units 202 and 202$^m$ with each of the T1 side units 200 and 200$^n$ for converting the signaling carrying signals ATM-T1 or T1-ATM is signalling transfer processor 206.

Since the upstream bandwidth of the cable systems is considerably more limited than the downstream bandwidth, it is necessary to provide cable service within a particular geographical area by means of a plurality of feeder cables all connected to the same headend of the cable TV system. In operation that generally converts to an isolated feeder cable per neighborhood. Thus a separate TV cable side unit 202 is needed for each common shared frequency division multiplexed channel with each being able to handle perhaps 8–10 terminal devices using cell transmissions at the same time. Similarly, each T1 side unit has a 23 channel capacity limit and since, statistically not all of the capacity of each of the TV cable side units will be used at any point in time, it is only necessary to provide sufficient capacity in total of all of the T1 side units to handle the statistical peak number of calls being handled by the total combination of the TV cable side units.

FIG. 5b is a block diagram that corresponds with that of FIG. 5a which is simplified in part in that only one each of TV cable unit 202 and T1 side unit 200 are shown, and expanded in part with the inclusion of added functional blocks within each of packetizing processor 204 and signalling transfer processor 206 that illustrate the conversion process of the up- and downstream signals ATM-T1 and T1-ATM in each block. In packetizing processor 204 in the upstream direction block 250 shows the conversion of ATM voice and data cells into T1/PCM channel 0 through 22 signals, and similarly in the downstream direction block 242 shows the conversion of T1/PCM channels 0 through 22 signals into ATM voice and data cells. In signalling transfer processor 206 in the upstream direction the ATM signalling cells conveying signalling data must be converted to HDLC signalling format and placed in T1/PCM channel 23 (block 262) to be carried upstream, and similarly in the downstream direction the HDLC signalling formatted information in T1/PCM channel 23 is converted to ATM cell format (block 256).

Figure 6:
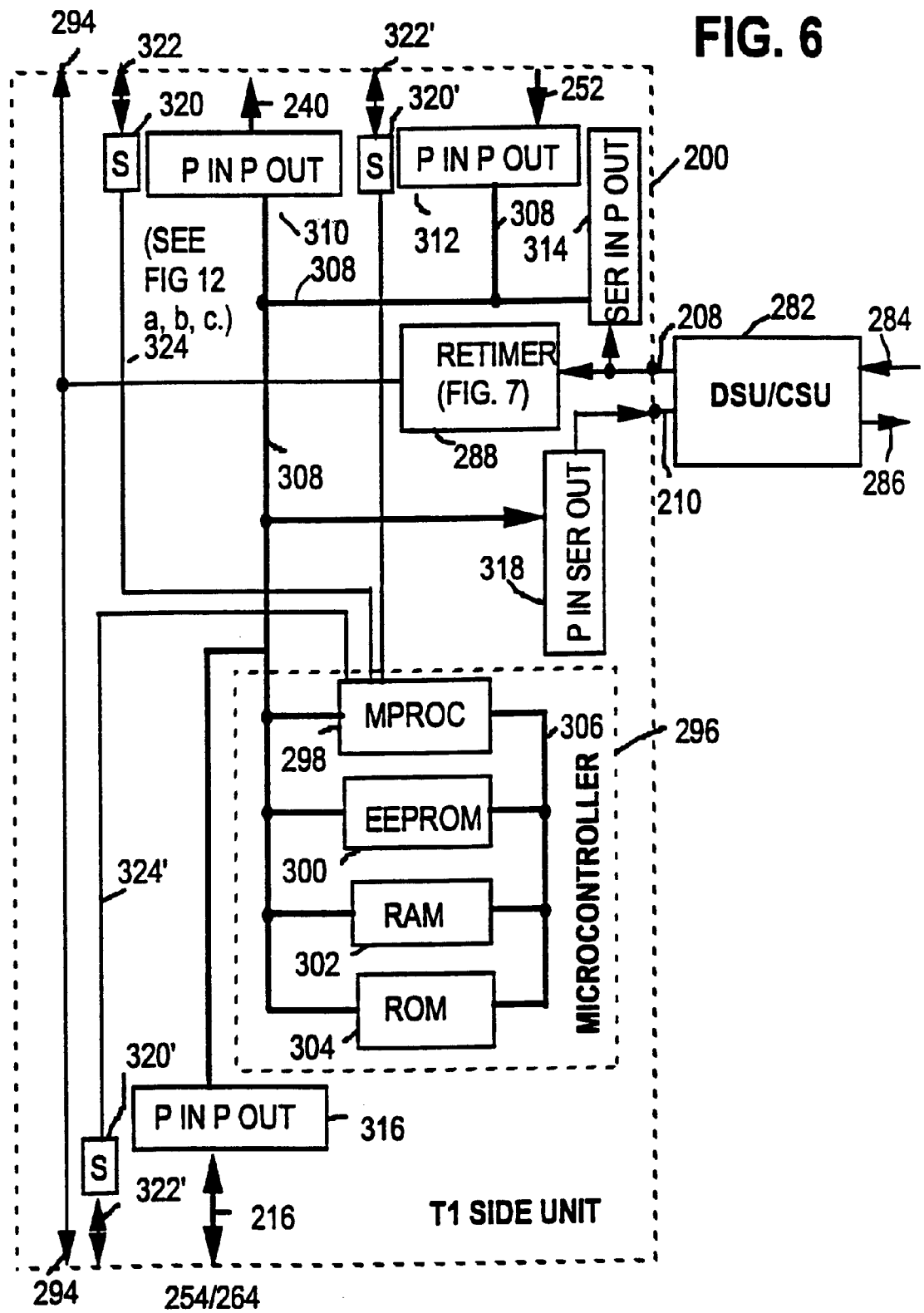
FIG. 6 is a detailed block diagram of one of the T1 side units of FIGS. 5a and 5b for connecting each T1 line to the system of the present invention.

In FIG. 6 T1 side unit 200 is expanded upon with the T1 link 52, 53 shown here as including DSU/CSU interface unit 282. The link 214 to packetizing processor 204 is shown here as the combination of lines 240 and 252, whereas the link 216 to signalling transfer processor 206 is shown here as 254/264 for later individual reference. As a T1/PCM signal is received from DSU/CSU 282 on line 208 it is directed to signal retimer 288 (only one of which is necessary for all of the T1 side units, which is also the case with respect to DSU/CSU 282) which is discussed in greater detail with respect to FIG. 7 and to a serial-in parallel-out buffer 314. The purpose of retimer 288 is to synchronize the T1 signals here with those of the telco since the T1 telco signals must be very precise and the output bus (see FIG. 7) form retimer 288 is directed to both signalling transfer processor 206 and packetizing processor 204. From serial-in parallel-out buffer 314 the downstream T1/PCM channel signals are placed on bus 308 and for direction to parallel-in parallel-out buffers 310 and 316 to direct channel 0–22 signals to packet processor 204 and the channel 23 signals to signalling transfer processor 206. Similarly the upstream signals from packet processor 204 and signalling transfer processor 206 are received by parallel-in parallel-out buffers 312 and 316, respectively, form which they are placed on signal bus 308 for transfer to parallel-in serial-out buffer 318 for transfer upstream via DSU/CSU 282. All of these functions are conducted under the control of microcontroller 296 and the included processor 298, EPROM 300, RAM 302 and ROM 304. Also shown here are semaphores 320, 320' and 320" to synchronize the timing of the transfer of signals between T1 side unit 200 and each of signalling transfer processor 206 and packetizing processor 204.

Figure 7:
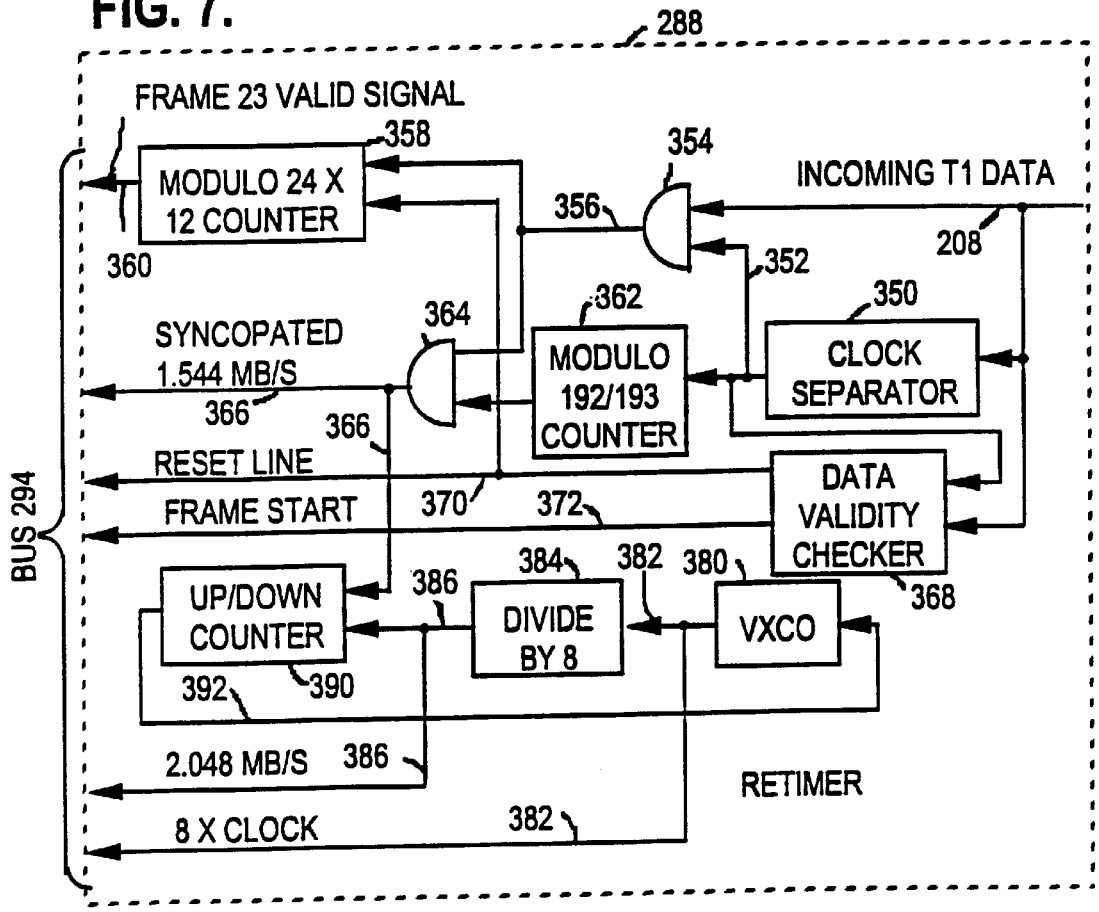
FIG. 7 is a block diagram of the Retimer Unit of FIG. 6 by which timing waveforms based on the T1 1.544 Mbps data timing are created for use in timing the ATM cells.

Retimer 288 is further expanded in FIG. 7. The T1 signals from the telco are time synchronous so that it is necessary for the upstream data stream to match this data rate. The signal on line 208 is the downstream signal from DSU/CSU 282 from the telco which is made up of 192 bits in the form of 24 data channels, each of 8 bits, with an added sync bit which may be either "1" or "0". That downstream signal is applied to AND gate 354, clock separator 350, and data validity checker 368. Clock separator 350 recreates a clock rate pulse from the incoming data signal and applies that pulse to AND gate 354, modulo 192/193 counter 362, and data validity checker 368. The signal from AND gate 354, in turn is applied to modulo 24×12 counter 360 and AND gate 364. Counter 362 then counts to either 192 or 193, depending on the state of the sync bit. The modulo 192/193 count from counter 362 and the reclocked data stream from AND gate 354 in AND gate 364 creates the syncopated clock signal on line 366. Data validity checker 368, using the reconstructed clock signal from clock separator 350 and the incoming data stream checks the data stream for the presence of unwanted patterns and generates a reset signal on line 370 if a problem is detected. Data validity checker 368 also generates a frame start pulse on line 372 to define the start time of each 192 bit data frame. The reset signal from data validity checker 368 is also applied to the modulo 24×12 counter 358 to trigger the start of the count to generate a frame 23 valid signal on line 360. Timer 288 also includes a local clock that is controlled by a crystal oscillator VXCO 380 that nominally operates at 8 times the desired clock signal to gain additional edge resolution. The 8x clock signal is brought out on line 382 and is applied to divider 384 to provide the desired 2.048 Mb/s clock signal on line 386. Line 386 is also connected to up/down counter 390, together with the syncopated clock signal on line 366, to generate a correction signal to be applied to VXCO 380 to correct the signal from the local oscillator. Then for purposes of simplicity, lines 360, 366, 370, 372, 386 and 382 are considered bus 294 in FIG. 6.

Figure 8:
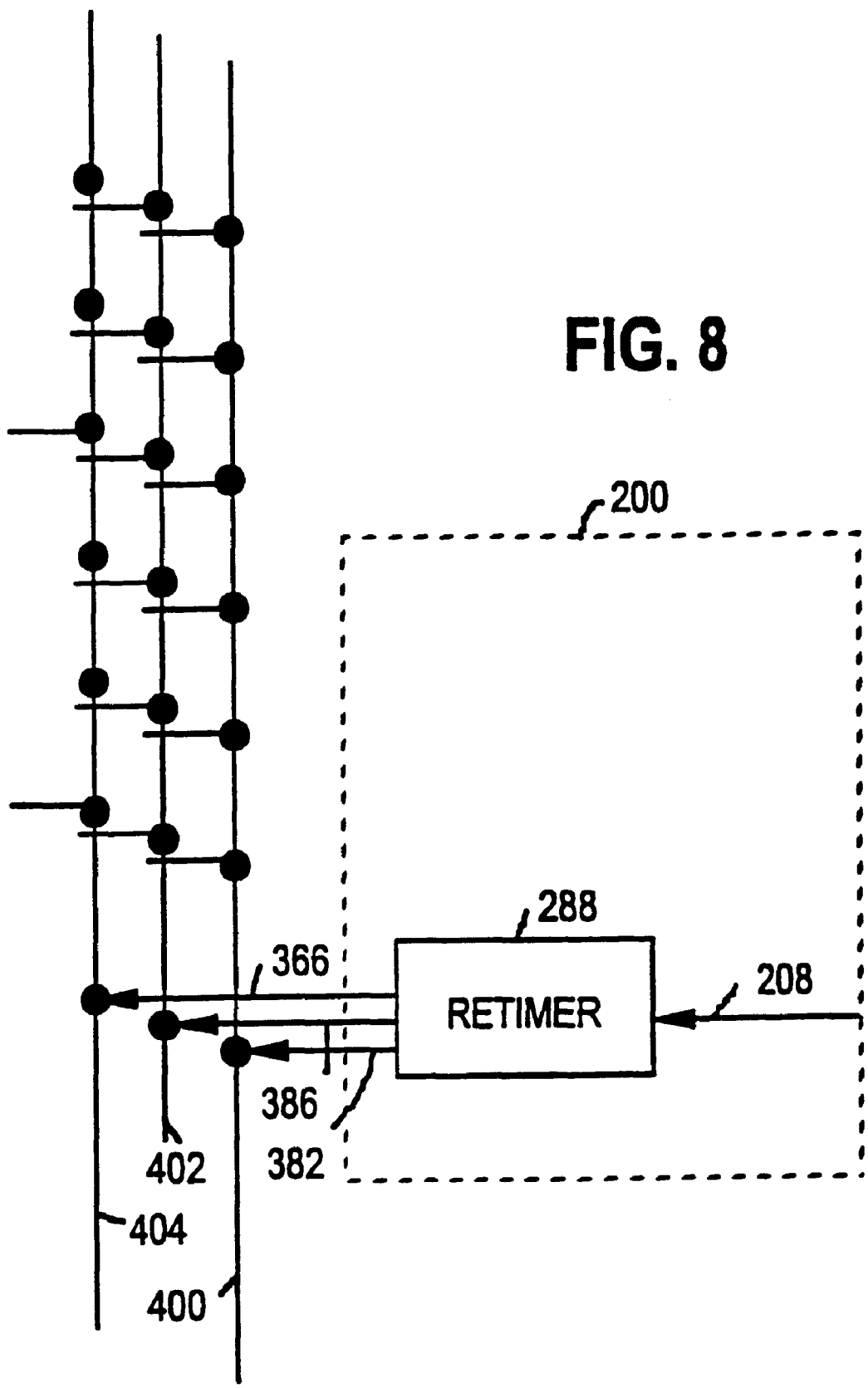
FIG. 8 is a partial block diagram showing the distribution of the retimed signals from one PCM channel for use throughout the ATM portion of the system.

In FIG. 8 there is shown a simplified T1 side unit 200 that contains retimer 288 with the syncopated clock line 366, 2.048 Mb/s clock line 386 and the 8x clock line 382 each feeding a corresponding bus 404, 402 and 400, respectively, for distribution for each of the T1 side units 200 included in the T1 terminator unit 51.

Figure 9:
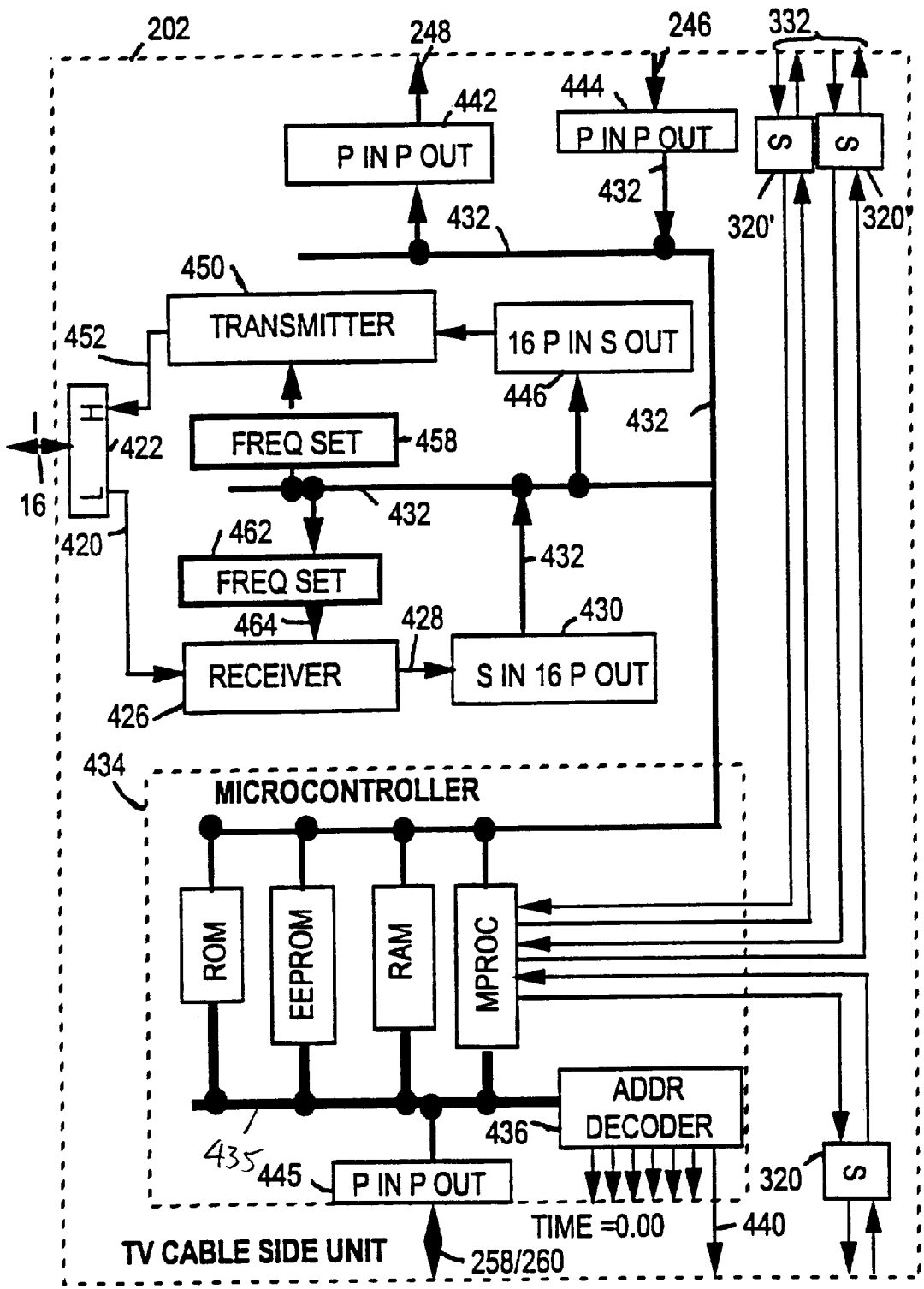
FIG. 9 is a detailed block diagram of one of the TV cable side units of FIGS. 5a and 5b.

In FIG. 9 TV side cable unit 202 is shown in greater detail with TV cable 16 shown to the left in communication with the TV cable modem which consists of high/low filter 422, high frequency upstream transmitter 450, low frequency downstream receiver 426, the corresponding frequency control blocks 458 and 462, respectively, which are controlled by microcontroller 434 via data bus 432 for setting the operating frequencies for the selected band for the signals to and from the subscriber. An downstream ATM cell from receiver 426 is transferred to serial-in/16 bit parallel-out buffer 430 (with 16 bits or more being selected to give more resolution for setting the frequencies of transmitter 450 or receiver 426) from which it is applied to data bus 432 and in-turn transferred to parallel-in/parallel-out buffer 442 for transfer to packetizing processor 204 via bus 248 if the ATM cell contains voice or data information. In reverse, an upstream voice or data signal from the subscriber is received from packetizing processor 204 via bus 246 by parallel-in parallel-out buffer 444, which in turn supplies that signal to bus 432. From bus 432 it is applied to 16 bit parallel-in serial out buffer 446 for application to transmitter 450, the high pass filter in filter 422 and then to TV cable 16.

If the signals up- and downstream containing signalling and address information then they are exchanged with signalling processor 206 by microcontroller 434 which receives or delivers then, from or to the transceiver section discussed above via bus 432. Microprocessor 434, in order to determine if the ATM cell currently on bus 432 contains signalling information and is to be directed to signalling processor 206 examines the signalling bit in the header of the ATM cell and if it is set then ATM cell is directed to signalling processor 206. To accomplish that, the ATM cell is read into the ROM of microcontroller 434 for deliver to bus 435 and to address decoder 436 and parallel-in parallel-out buffer 445 for delivery to signalling processor 206.

Also shown in FIG. 9 are semaphores 320, 320' and 320" to synchronize the timing of the transfer of signals between TV cable side unit 202 and each of signalling transfer processor 206 and packetizing processor 204.

Figure 10:
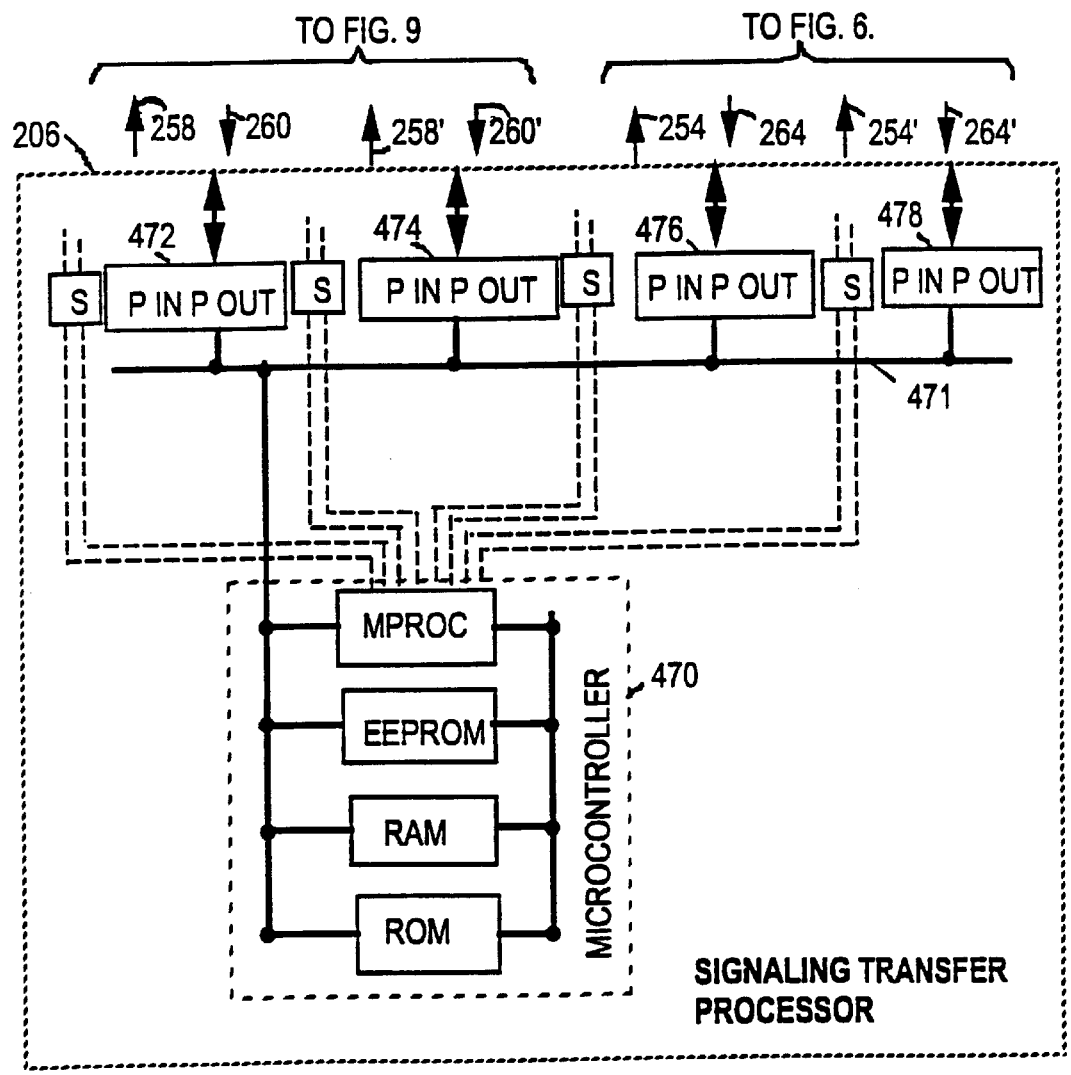
FIG. 10 is a detailed block diagram of the signaling transfer processor of FIGS. 5a and 5b.

FIG. 10 is a hardware block diagram of signaling transfer processor 206 of FIGS. 5a and 5b. This unit consists of a parallel-in/parallel-out buffers (472, 474, 476, 478) and a semaphore flag S that is associated with each one of said TV cable side units 202 and each T1 side units 200 (here four such buffers are shown since the example of FIG. 5a includes only two of each of the TV and T1 side units). Each of the buffers supplies and receives, as appropriate, a signal to and from data bus 471 under control of microcontroller 470 which manipulates the signals in the various buffers as per the flow diagrams identified in FIG. 5b. Additionally, each of the semaphore flags is read and set by the microprocessor of microcontroller 470 to coordinate the timing of the data conversions and transfers performed here and the transfer of data at the interface to the various TV and T1 side units.

Similarly, FIG. 11 is a hardware block diagram of packetizing processor 204 of FIGS. 5a and 5b. This unit consists of a parallel-in/parallel-out buffers (504, 506, 508, 510) and a semaphore flag S that is associated with each one of said TV cable side units 202 and each T1 side units 200 (here four such buffers are shown since the example of FIG. 5a includes only two of each of the TV and T1 side units). Each of the buffers supplies and receives, as appropriate, a signal to and from data bus 502 under control of microcontroller 500 which manipulates the signals in the various buffers as per the flow diagrams identified in FIG. 5b. Additionally, each of the semaphore flags is read and set by the microprocessor of microcontroller 500 to coordinate the timing of the data conversions and transfers performed here and the transfer of data at the interface to the various TV and T1 side units.

Figure 12A:
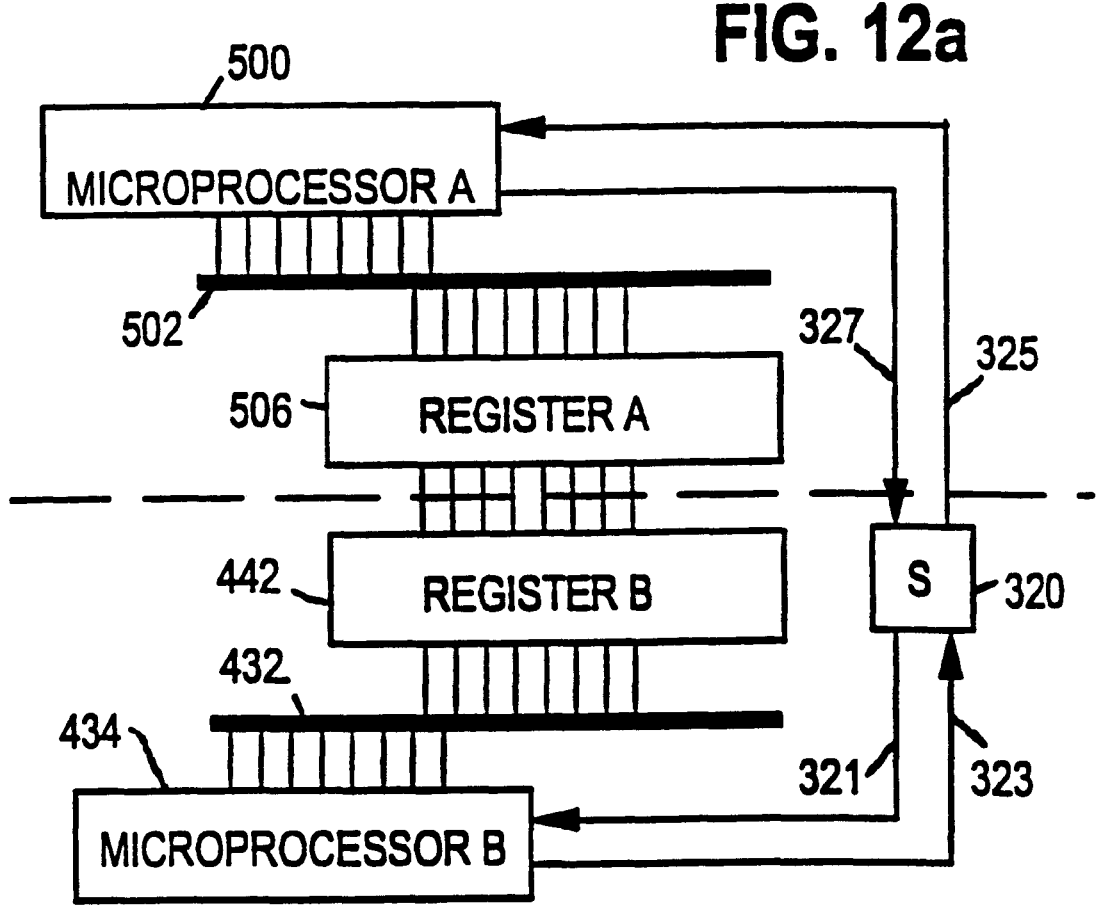
FIG. 12a is a simplified block diagram showing the implementation details of the subsystem for generating semaphore signals.
Figure 12B:
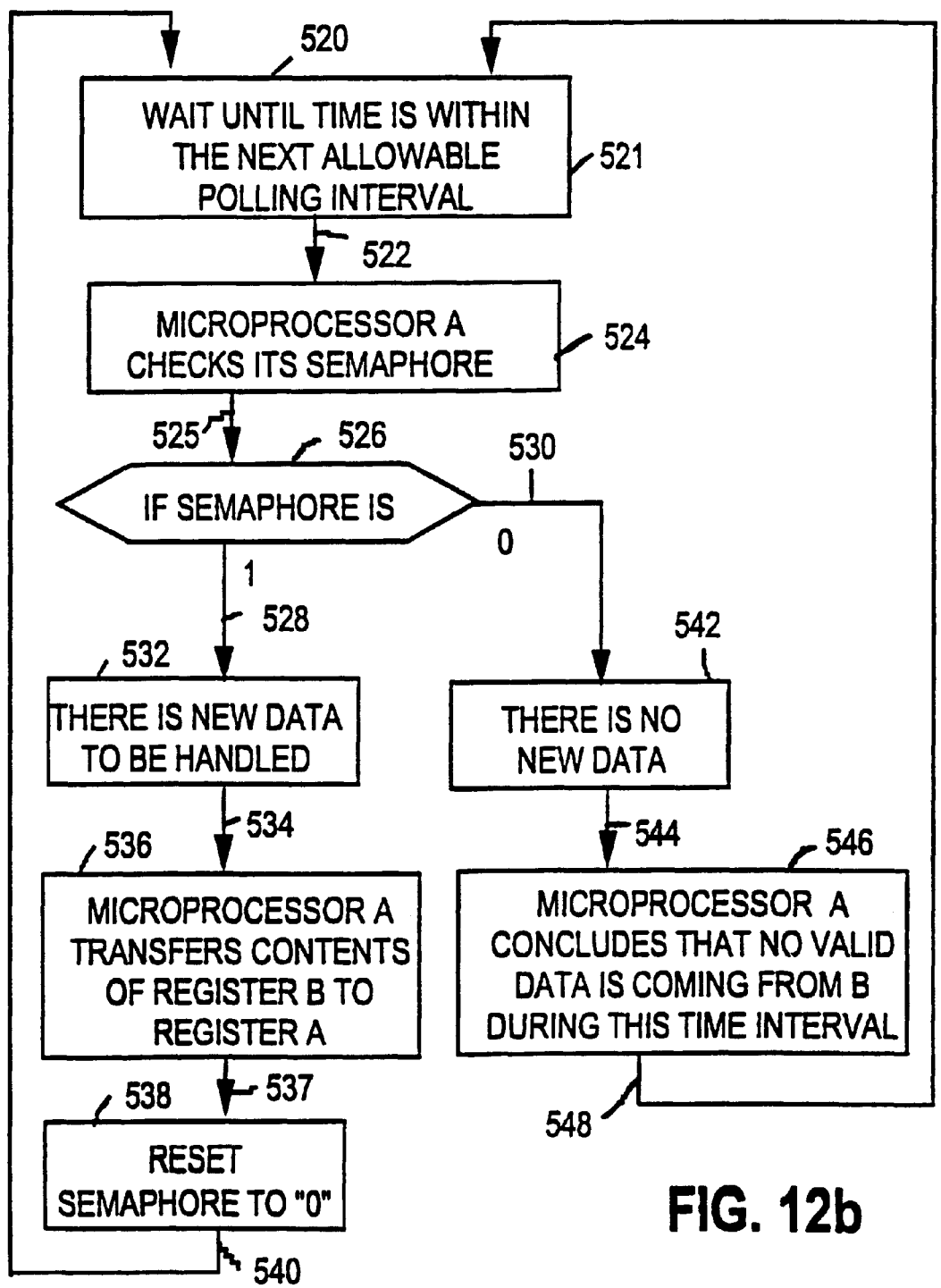
FIG. 12b and 12c are flow charts detailing the operation of the semaphore interchange from the point of view of microprocessors A and B in FIG. 12a, respectively.
Figure 12C:
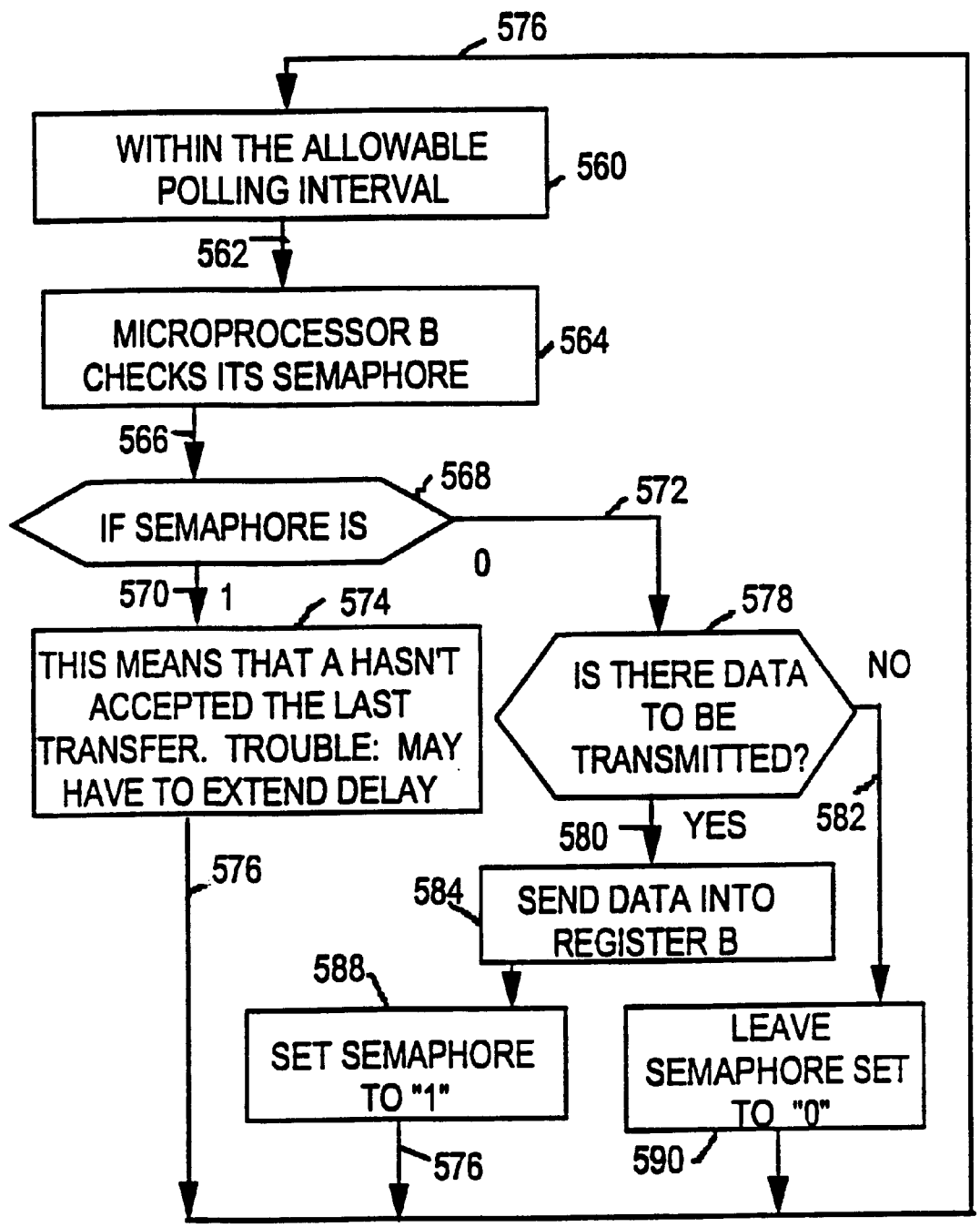

FIGS. 12a through 12c are provided to illustrate the operation of the semaphore system of the present invention and how they function between each of the pair of units where they are used as discussed generally above. For purposes of illustration the interaction between the semaphores of packetizing processor 204 and TV cable side unit are used in the simplified block diagram of FIG. 12a. Here there is shown a microprocessor 434 and 500 on either side of the interface with a single semaphore 320 shared between them, unlike what might have been mistaken in FIGS. 9 and 11 as there being a first semaphore talking to a second semaphore on each side of the interface.

FIGS. 12b and 12c are flow charts detailing the operation of microprocessors A and B (500 and 434, respectively) with respect to semaphore 320 in the interchange of data between the two units from the individual points of view of microprocessors 500 and 434 in FIG. 12a, respectively. FIG. 12b is a flow chart that describes the operation of microprocessor 500 and its interaction with semaphore 320 to control the exchange of data with the unit controlled by microprocessor 434. The decision flow begins at block 520 with microprocessor A (500) waiting for the next allowable interval. When that time arrives, microprocessor A checks the state of the shared semaphore (320) with microprocessor B (434) (block 524). If semaphore 320 (block 526) is set to zero then no data is available (block 542) and microprocessor A concludes that there is no data to be transferred from the unit controlled by microprocessor B (434) (block 546) and control returns to block 520 to await the next allowable polling interval.

If semaphore 320 is set to "1", then control proceeds to block 532 where it is noted that there is data available with microprocessor A proceeds to transfer the data in register B (442) in the unit of microprocessor B to register A (506) within the same unit as microprocessor A (block 536). Following the transfer of the data between the registers, microprocessor A resets semaphore 320 to "0" (block 538) and control is returned to block 520 to await the next allowable polling interval.

Considering the interface operation from the point of view of microprocessor B (434), refer now to FIG. 12c. The process begin at block 560 where microprocessor B awaits the next allowable polling interval during which it proceeds to check the status of semaphore 320 (block 564). If semaphore is set to "0" (block 568), microprocessor B next checks for data that it has that is awaiting to be transferred to the unit of microprocessor A (block 578). If no data is present, then the semaphore is left set to "0" (block 590) and control is returned to block 560 to await the next allowable polling interval.

If the test at block 578 indicates that there is data awaiting to be transferred, then that data is transferred from register B to register A (block 584), the semaphore is set to "1", and control is returned to block 560 to await the next allowable polling interval.

At block 568 if the semaphore is set to "1" microprocessor notes that register A has not accepted a previous data transfer and the delay between sending the next data packet may have to be extended or there is some other problem, e.g. there has been a failure of the semaphore (block 574), and then control is returned to block 560 to await the next allowable polling interval.

For purposes of illustration FIGS. 12a through 12c only discuss the semaphore operation for what in the overall system operation would be an upstream data transfer. When there is a downstream data transfer between the same units, the interaction between then with respect to the semaphore is the same with the function of microprocessors A and B being reversed. Further, the operation of the semaphores is the same between any two units in the above describe system is the same as that described here for these two units.

Another feature of the present invention is the broadening of the earlier concepts disclosed in FIG. 2, as well as the cross-referenced pending patent applications of the same inventor, by providing the capability for supporting multiple alternative terminal air interfaces between subscriber cordless devices 8 and SIU 14. To fully accomplish this goal, SIU 14 is modified to provide the necessary flexibility to support the use of an ATM cell based and any non-cell based cordless devices 8 by the same SIU 14, unlike the originally described operation where multiple cordless devices of the same cell or non-celled based configuration could be handled simultaneously by the same SIU 14. Thus in this configuration, SIU 14 may also support one or more markedly different protocols and arrangements now in place and used by currently available and future cordless devices 8 until a common standard is achieved, if ever.

Figure 13:
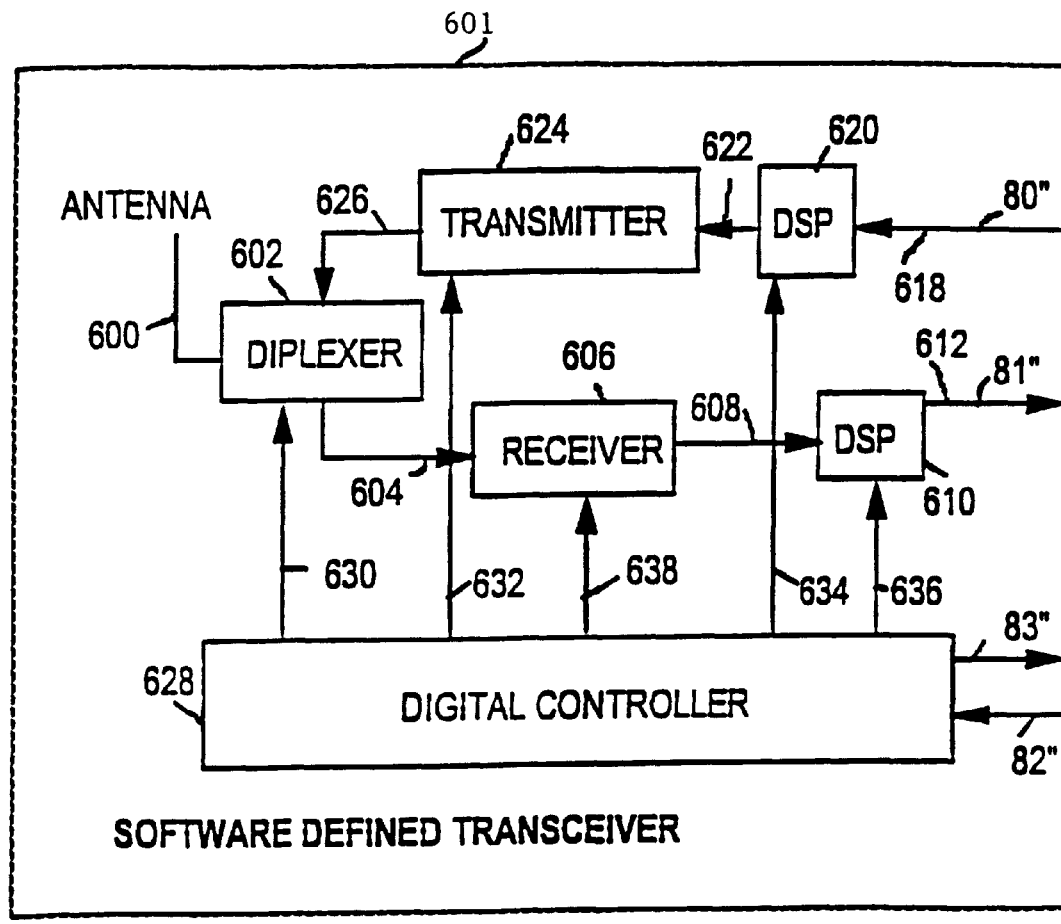
FIG. 13 is a block diagram of the software defined transceiver of FIG. 3a for use in supporting multiple possible mode subscriber terminal units.

Thus, SIU 14 in the preferred configuration could have been a fixed wired configuration in FIG. 3a, however, if the software defined transceiver as shown in FIGS. 3a and 13 is used for either application, it would also be possible to program the SIU to operate either in the preferred format with multiple subscriber units each of the same cell transmission mode, or in the secondary embodiment with the capability of supporting one subscriber terminal at a time wherein that terminal can be of any cell based or non-cell based format. However, if the processing of the signals is performed using fast Fourier transforms it is also possible to interface with multiple terminals each in the same signal format but transmitting at different frequencies.

This arrangement thus allows support of both ATM cell-based and non-cell-based devices, irrespective of the different interface standards present, but with only one being used at any instant in time. This freedom of choice thus allows a transitional multiple mode capability so that other PCS and cellular type telephone instruments can also be used with the system of the present invention. To do this, SIU 14 of FIG. 13 converts conventional serial signal streams from PCS cordless devices into compatible ATM cell based signals that become a universal interface signal with T1 terminator unit 51.

The concept of dual mode subscriber terminal devices is well known with several manufacturers having announced dual mode cellular telephone products. Generally one of the two modes is cellular AMPS (Advanced Mobile Phone System) while the other is a PCS technology. Unlike the case where the circuitry and programming that must be replicated in each cordless terminal unit to operate in each mode varies by the nature of the particular mode combination chosen, the present invention creates a multimode capability in SIU 14 and not the subscriber's cordless terminal instrument.

As discussed above, the preferred operational mode of the present invention is the use of ATM cells down to the subscriber's cordless terminal, while secondary modes might include one or more of the PCS standards, such as DECT, CT2, GSM or other non-cell forms of PCS. Of course when SIU 14 is supporting several different modes of signal transmission, a single SIU 14 would be able to support only a single mode at a time. The capability to support multiple simultaneous conversations as described in the above cross referenced related patent applications can only be performed by a single SIU 14 in the preferred operational mode.

Figure 14:
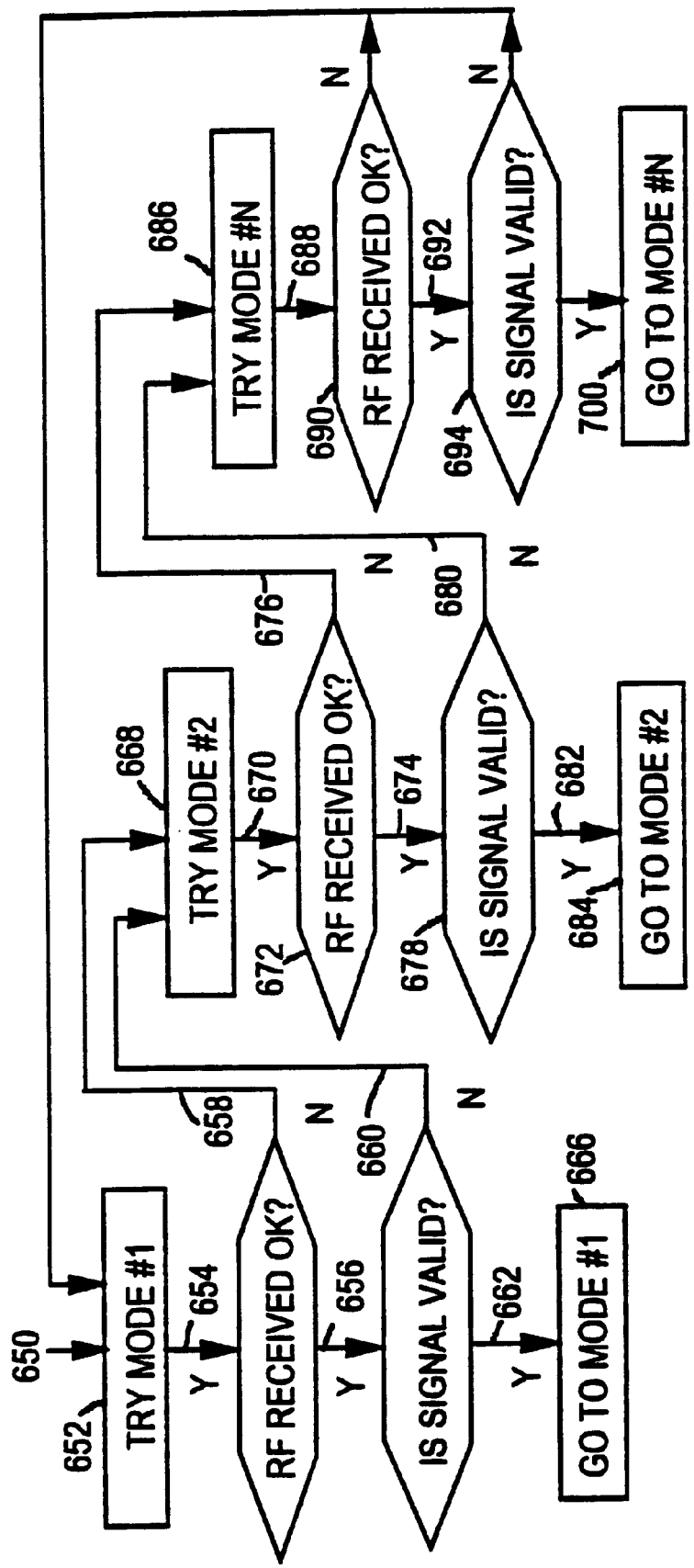
FIG. 14 is a flow chart of the adaptation process of the Multimode Subscriber Unit of FIG. 13.

The embodiment supporting a multiplicity of different air interfaces with cordless subscriber devices 8 is implemented, as discussed below in relation to FIGS. 13 and 14, by transforming, as necessary, the signals from the various devices 8 to a single signal format for transmission to a remote cellular switching center, e.g. MTSO 54. The key concept here is the realization that while each of several personal communications air interfaces are in use or proposed, each have totally different signal and protocol requirements. Upon closer examination, however, it is noted that those requirements can be broken down into common functions—a generic transmitter, a generic receiver, and a generic processor. The transmitter and receiver can each be instantly software definable since each operates at a limited number of frequencies. While these frequencies are different for each of the PCS systems they are sufficiently clustered so that a single frequency agile unit can be designed to meet the needs of each system. The number of center frequencies for the existing and proposed PCS systems is quite limited, there are only about two bands, 900 MHz and 1800 MHz which can easily be accommodated in the same unit. It is also possible that the receiver could even be a homodyne receiver that does not need and IF, but that is not mandatory. The processor and the logic is the easiest part of the equation in that it potentially requires only different software for each system. Thus, a single hardware SIU 14 can be designed to appear to be one or more software definable SIUs.

The main building blocks of each of the existing and proposed PCS systems are:

1. RF Center Frequency Selection

Almost all of the new generation personal communications terminals tend to operate in the frequency range of 800 to 1000 MHz or 1800 to 2200 MHz. Local oscillators, frequency synthesizers and similar functions may all be served by a common frequency agile module, with plug-in filters and a diode switch to select the filters.

2. Diplexing Selection

All non-cell format terminals can be divided into two classes of diplexing, Time Division Diplexing (TDD) and Frequency Division Diplexing (FDD). In TDD the transmitter and the receiver are sequentially connected to a common antenna to provide the illusion of simultaneous transmission and reception while the FDD approach requires carefully match filters.

3. Transmitter Selection

Hand held cellular devices operate at a 600 mW level and, the smaller PCS devices operate at 100 mW and less. Dynamic power reduction is generally used and is of primary importance in certain CDMA approaches necessary to maximize the numbers of users on an rf channel. The short ranges used with the present system allow much lower power densities than found in most transceiver devices designed for longer range objectives than needed to reach an in-house Subscriber Interface Unit, generally less than 60 meters.

4. Receiver Selection

The key receiver variable is bandwidth. Most PCS systems use a broadband channel that is in turn time subdivided into separate channels. Diode switched filters allow the matching of the bandwidth to the application.

5. A/D Conversion

The output of the receivers can be handled in a generic manner by an analog/digital conversion of the received signal and its quadrature component sampled at a rate commensurate with the symbol rate used.

6. A/D Output

The output of the receiver after the analog to digital process, is a set of paired digital values generated at the sampled data rate appropriate to the incoming symbol rate.

7. Digital Signal Processing (DSP)

The digital stream containing measurements of the two quadrature signal components of the received waveform are next processed using a general purpose processor to produce the desired outgoing digital signal. The term DSP is intended only in an overall sense, defined to include constellation fitting, interpolation and control as well as forward error correction, voice dynamic range expansion, decoding of signaling commands, etc.

In summary, a feature of the present invention creates a generic transmit/receive capability wherein by changing parameter settings causes the structure of the SIU to be changed to match a different air interface as needed. While it is obvious that it is less expensive to restrict manufacture to a single standard, permitting a single SIU instrument to serve any of several different PCS/cellular formats is considered to be an economically advantageous feature to justify the additional complexity and cost.

While this discussion speaks in terms of generic transceivers operating in the 800 to 1000 MHz range and the 1800 to 2200 MHz range it is obvious to one skilled in the art that other frequencies could be chosen as well such as 5400 MHz, or even 40 MHz as used for cordless telephones.

Referring now to FIG. 13 there is shown a programmable SIU 14 (see FIG. 2) for use with various non-cell based cordless subscriber units 8, one at a time. To support the simultaneous use of multiple terminals 8 of different signal transmission modes, SIU 14 would have to create a separate virtual transceiver for each terminal transmission mode in use at that time. As shown, software defined transceiver 601 includes a receiving digital processor 620 coupled to programmable transmitter 624, a sending receiver 606 coupled to sending processor 610, and a diplexer 602 and associated antenna 600 for transmission to and from subscriber terminal 8. In the sending direction, subscriber terminal 8 transmits a signal which impinges antenna 600, is then directed by diplexer 602 to programmable receiver 606, to sending digital processor 610 to be converted into ATM cells as necessary and written to buffer 81" in microcontroller 72 (see FIG. 3*a*). In the receiving direction, the ATM cell to be received is read from receiving buffer 80" of microcontroller 72 (see FIG. 3*a*) by receiving processor 620 where it is converted to the signal mode of terminal unit 8 if it is other than ATM based. The signal from receive processor 620 is then transferred to receive transmitter 624, applied to diplexer 602 and antenna 600 and transmitted to terminal 8. Additionally, the function of each of the above-described units, other than antenna 600 and TV cable modem 108 are controlled by digital controller 628 which is programmed to adjust, or program, the operation of each of those units in response to the type of terminal device being used by the subscriber and to convert to and from ATM cell based on the transmission mode of terminal 8.

The key to the operation of programmable SIU 14 is that the mode of operation for both upstream and downstream transmission is defined by the operational mode of the terminal 8 of interest. In operation then, digital controller 628 of software defined transceiver 601 of FIG. 13 is programmed sequentially to look for each expected form of modulation and data formats in the receive mode. This operation of software defined transceiver 601 of FIG. 13 is illustrated in block diagram form in FIG. 14 in simplified form. When there is a signal, either send or receive, digital controller 628 initially trys the default mode (Mode #1) of block 652. Receiver 606 is checked for receipt of an RF signal (block 656), if one is received the characteristics of the signal is checked against those for Mode #1 (block 662), and if the characteristics match then Mode #1 is selected (block 666). If either the RF signal is not received (block 656) or the received signal is not valid (block 662) control is directed to block 668 to try Mode #2. The same tests as for Mode #1 are performed for Mode #2 in blocks 672 and 678, with Mode #2 being selected if both tests are successful (block 684), otherwise control shifts to block 686 to try Mode #N with the tests being conducted again in blocks 690 and 694 with Mode #N being selected if the tests are successful (block 700) or if either test fails control is returned to block 652 to restart the process for Mode #1. As stated above, this procedure continues until the correct mode is determined and established by digital controller 628.

The preferred embodiment here and in the above cross-referenced patent applications by the same inventor each uses an ATM cell format that is an "ATM compliant cell" format that differs from full standard ATM cell format in that some of the payload space is reserved to contain additional addressing space that is needed to expand the address space beyond the standard 5-byte ATM header to permit the addressing of cell to specific subscriber terminal devices. The additional address bits in the ATM compliant cells are invisible to the conventional ATM switches, thus allowing there use with conventional ATM networks as well. Additionally, as used in this application the term compliant ATM cells includes cells that contain control signals and which may be of a different length than the cells that contain data or voice information.

Although the description above primarily discuss the use of present generation implementation techniques, some specific technologies involved in the preferred embodiments of the present invention are expected to change as time evolves. Further, as will be understood by those familiar with the art, the present invention may be embodied in other specific forms without departing form the spirit or essential characteristics thereof. The scope of the present invention therefore in its full interpretation is only to be limited by the scope of the claims appended hereto.

What is claimed is:

1. A multiple mode transmission arrangement for cell communication with a plurality of rf transceivers, said transmission arrangement comprising:

a first subgroup of rf transceivers having at least one of said plurality of rf transceivers in said first subgroup with the population of the first subgroup defined by a first set of operating parameters including signal format and type of modulation that are suitable for ATM cell transmission;

a second subgroup of rf transceivers having at least a different one of said plurality of rf transceivers in said second subgroup with the population of the second subgroup defined by a second set of operating parameters including signal format and type of modulation that are suitable for non-cell transmission; and a relay transceiver having the capability to sequentially test signals received from any of said rf transceivers to determine to which of said first and said second subgroups each rf transceiver transmitting a signal belongs by sequentially programming said relay transceiver to look for each expected form of modulation and data formats in the receive mode, and to sequentially change the operating parameters of the relay transceiver to match those of each rf transceiver with which there is a present communication link with the additional capability to convert signals received from each rf transceiver in said second subgroup of rf transceivers into ATM cell based signals and to convert ATM cell based signals to signals to be transmitted to, and compatible with, rf transceivers of said second subgroup of rf transceivers.

* * * * *